United States Patent
Nayak et al.

(10) Patent No.: US 12,267,784 B2
(45) Date of Patent: Apr. 1, 2025

(54) APPARATUS AND METHOD FOR INTERVAL ADJUSTMENT FOR WI-FI TARGET WAKE TIME

(71) Applicant: Samsung Electronics Co., Ltd., Suwon-si (KR)

(72) Inventors: Peshal Nayak, Plano, TX (US); Wenxun Qiu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 17/646,471

(22) Filed: Dec. 29, 2021

(65) Prior Publication Data

US 2022/0217638 A1    Jul. 7, 2022

Related U.S. Application Data

(60) Provisional application No. 63/134,787, filed on Jan. 7, 2021, provisional application No. 63/183,957, filed on May 4, 2021, provisional application No. 63/249,971, filed on Sep. 29, 2021.

(51) Int. Cl.
*H04W 52/02* (2009.01)
*H04W 84/12* (2009.01)

(52) U.S. Cl.
CPC ........ *H04W 52/0258* (2013.01); *H04W 84/12* (2013.01)

(58) Field of Classification Search
CPC ............................ H04W 52/0258; H04W 84/12
USPC ........................................................ 370/311
See application file for complete search history.

(56) References Cited

U.S. PATENT DOCUMENTS

| | | |
|---|---|---|
| 10,764,900 B1 | 9/2020 | Gopalakrishnan et al. |
| 10,834,670 B2 | 11/2020 | Hou et al. |
| 10,925,001 B2 | 2/2021 | Bhanage et al. |
| 2018/0115950 A1 | 4/2018 | Asterjadhi et al. |
| 2018/0288703 A1 | 10/2018 | Sun et al. |
| 2018/0295573 A1 | 10/2018 | Gidvani et al. |
| 2019/0021055 A1 | 1/2019 | Guo et al. |
| 2019/0124593 A1 | 4/2019 | Wong et al. |
| 2019/0230591 A1 | 7/2019 | Gan et al. |
| 2019/0253968 A1 | 8/2019 | Xiao et al. |

(Continued)

OTHER PUBLICATIONS

IEEE Standard for Information Technology—Telecommunications and Information Exchange between Systems Local and Metropolitan Area Networks—Specific Requirements, "Part 11: Wireless LAN Medium Access Control (MAC) and Physical Layer (PHY) Specifications, Amendment 1: Enhancements for High-Efficiency WLAN", IEEE Std 802.11ax-2021, May 19, 2021, 767 pgs.

(Continued)

*Primary Examiner* — Gbemileke J Onamuti

(57) ABSTRACT

Embodiments of the present disclosure provide methods and apparatuses for adjusting target wake time (TWT) parameters, and in particular a TWT interval. An apparatus comprises a transceiver and a processor operably coupled to the transceiver. The transceiver is configured to receive WI-FI traffic for an application in a target wake time (TWT) operation. The processor is configured to identify whether a state of the electronic device is idle or active based on at least one of a traffic statistic related to the WI-FI traffic or an application identifier of the application and adjust a TWT interval of the TWT operation based on the state.

18 Claims, 24 Drawing Sheets

(56) References Cited

U.S. PATENT DOCUMENTS

2020/0137612 A1    4/2020  Li et al.
2021/0297948 A1    9/2021  Wang et al.
2022/0095222 A1*  3/2022  Hsu ........................ H04W 4/80

OTHER PUBLICATIONS

Extended European Search Report issued Feb. 27, 2024 regarding Application No. 22736839.6, 9 pages.
International Search Report and Written Opinion issued Apr. 11, 2022 regarding International Application No. PCT/KR2022/000194, 6 pages.
Baron et al. (Canon), "Low-Latency Triggered TWT", doc.: IEEE 802.II-20/1843r2, Dec. 2020, 14 pages.

* cited by examiner

APPARATUS AND METHOD FOR INTERVAL ADJUSTMENT FOR WI-FI TARGET WAKE TIME

CROSS-REFERENCE TO RELATED APPLICATION(S) AND CLAIM OF PRIORITY

This application claims priority under 35 U.S.C. § 119(e) to U.S. Provisional Patent Application No. 63/134,787 filed on Jan. 7, 2021, U.S. Provisional Patent Application No. 63/183,957 filed on May 4, 2021, and U.S. Provisional Patent Application No. 63/249,971 filed on Sep. 29, 2021, which are hereby incorporated by reference in their entirety.

TECHNICAL FIELD

This disclosure relates generally to power management in wireless communications systems. Embodiments of this disclosure relate to methods and apparatuses for adaptively determining parameters for target wake time configuration for communications in a wireless local area network communications system to enhance power savings.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. WI-FI alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) for improving power efficiency. The wake time negotiation gives rise to TWT sessions (e.g., consecutive TWT sessions), where the STA wakes up at pre-negotiated times and for specified durations of time to communicate with the AP (e.g., via UL and/or DL communications). The IEEE 802.11ax amendment allows for periodic awakening, non-periodic awakening, and at-will awakening by the STA.

The negotiated parameters such as the wake interval, wake duration, and initial wake time (offset) highly affect latency, throughput as well as power efficiency, which are directly related to QoS (quality of service) or customer experience. Services with different traffic characteristics will have different TWT parameter configurations for better QoS. Additionally, the TWT configuration should adapt to network and service status variation.

TWT allows the non-AP STAs to wake up at a designated time only, and thereby reduce power consumption. Some applications (e.g., cloud gaming, AR glasses) can have periodic burst traffic with very strict latency requirements. In setting up TWT by a non-AP STA, the STA may not have timing information related to downlink packets (e.g., arrival time of downlink traffic). Downlink packet information is affected by the TWT parameters as well as by network conditions which can impact contention times. Consequently, the data that is available at the STA-side has timing information after the application of TWT parameters.

SUMMARY

Embodiments of the present disclosure provide methods and apparatuses for obtaining timing information and performing a time offset adjustment for target wake time (TWT) operations in a wireless network (e.g., a WLAN).

In one embodiment, an electronic device is provided, comprising a transceiver and a processor operably coupled to the transceiver. The transceiver is configured to receive WI-FI traffic for an application in a target wake time (TWT) operation. The processor is configured to identify whether a state of the electronic device is idle or active based on at least one of a traffic statistic related to the WI-FI traffic or an application identifier of the application and adjust a TWT interval of the TWT operation based on the state.

In another embodiment, a method for adjusting target wake time (TWT) parameters is provided, including the steps of receiving, by an electronic device, WI-FI traffic for an application in a TWT operation, identifying whether a state of the electronic device is idle or active based on at least one of a traffic statistic related to the WI-FI traffic or an application identifier of the application, and adjusting a TWT interval of the TWT operation based on the state.

In another embodiment, a non-transitory computer-readable medium is provided, and is configured to store instructions that, when executed by a processor, cause an electronic device to: receive WI-FI traffic for an application in a target wake time (TWT) operation, identify whether a state of the electronic device is idle or active based on at least one of a traffic statistic related to the WI-FI traffic or an application identifier of the application, and adjust a TWT interval of the TWT operation based on the state.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
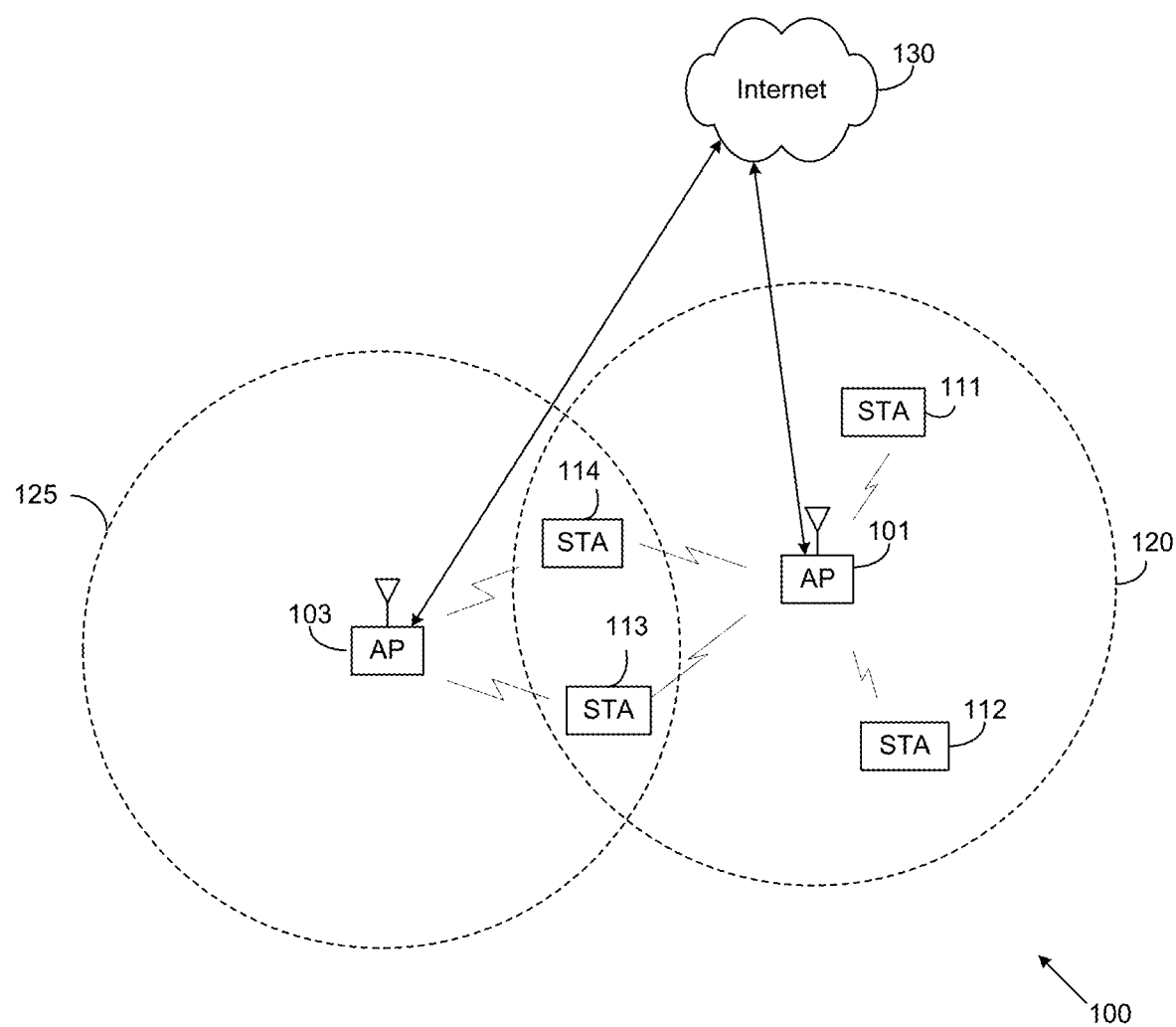
FIG. 1 illustrates an example wireless network according to various embodiments of the present disclosure.

FIGS. 1 through 21C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

WI-FI is one of the key technologies for providing connectivity today. With support for high speed communication over WI-FI, the usage of WI-FI has grown tremendously. Unfortunately, WI-FI usage also consumes a lot of power which can reduce battery life. Consequently, this power consumption is one of the important issues that needs to be handled, especially in mobile battery powered devices.

Target Wake Time (TWT) introduced by 802.11ax and adopted in the upcoming 802.11be WI-FI standards provides an opportunity to save power as devices can wake up to receive their data and then doze off, thereby conserving battery.

Embodiments of the present disclosure recognize that solutions to adaptively compute TWT parameters that determine power savings such as the TWT wake interval (hereafter referred to as TWT interval) are needed. Accordingly, embodiments of the present disclosure provide apparatuses and methods that address this problem of the lack of adaptive methods to compute key TWT parameters that can enhance power savings for wireless devices. For convenience, the wireless device used with embodiments of this disclosure will be referred to herein below as a STA, but it is understood that the embodiments of this disclosure could be performed by an AP or any other suitable WI-FI-capable device. That is, both the STA and AP can adjust the TWT interval based on the embodiments of this disclosure.

One of the key factors that determines the TWT interval suitable for a device is the characteristics of the traffic flow corresponding to an application that a user runs on the device. Conventional power saving solutions such as screen state based solutions, beacon-triggered solutions, and Unscheduled Automatic Power Save Delivery (U-APSD) solutions do not account for the traffic characteristics, and in some cases lead to latencies of 100 ms or larger for the device. Embodiments of this disclosure account for traffic flow characteristics to adapt the TWT interval for the next TWT session.

Embodiments of this disclosure enhance power savings by increasing the doze time for a given STA such that the STA can receive the data that is intended for it on the downlink and then doze off until the next batch of data intended for the STA becomes available. By leveraging the traffic characteristics, for a given TWT SP duration, embodiments of this disclosure can adjust the TWT interval to increase the doze state length (or doze period) to enhance power savings while avoiding a detrimental effect on the user experience (i.e., the length of the doze state can be increased without increasing latency experienced by the user as a result). Embodiments of this disclosure additionally identify idle and active periods of the STA so that the doze period can be adjusted by controlling the TWT interval values.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for determining parameters for target wake time (TWT) operations in WLANs (e.g., the TWT interval). Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
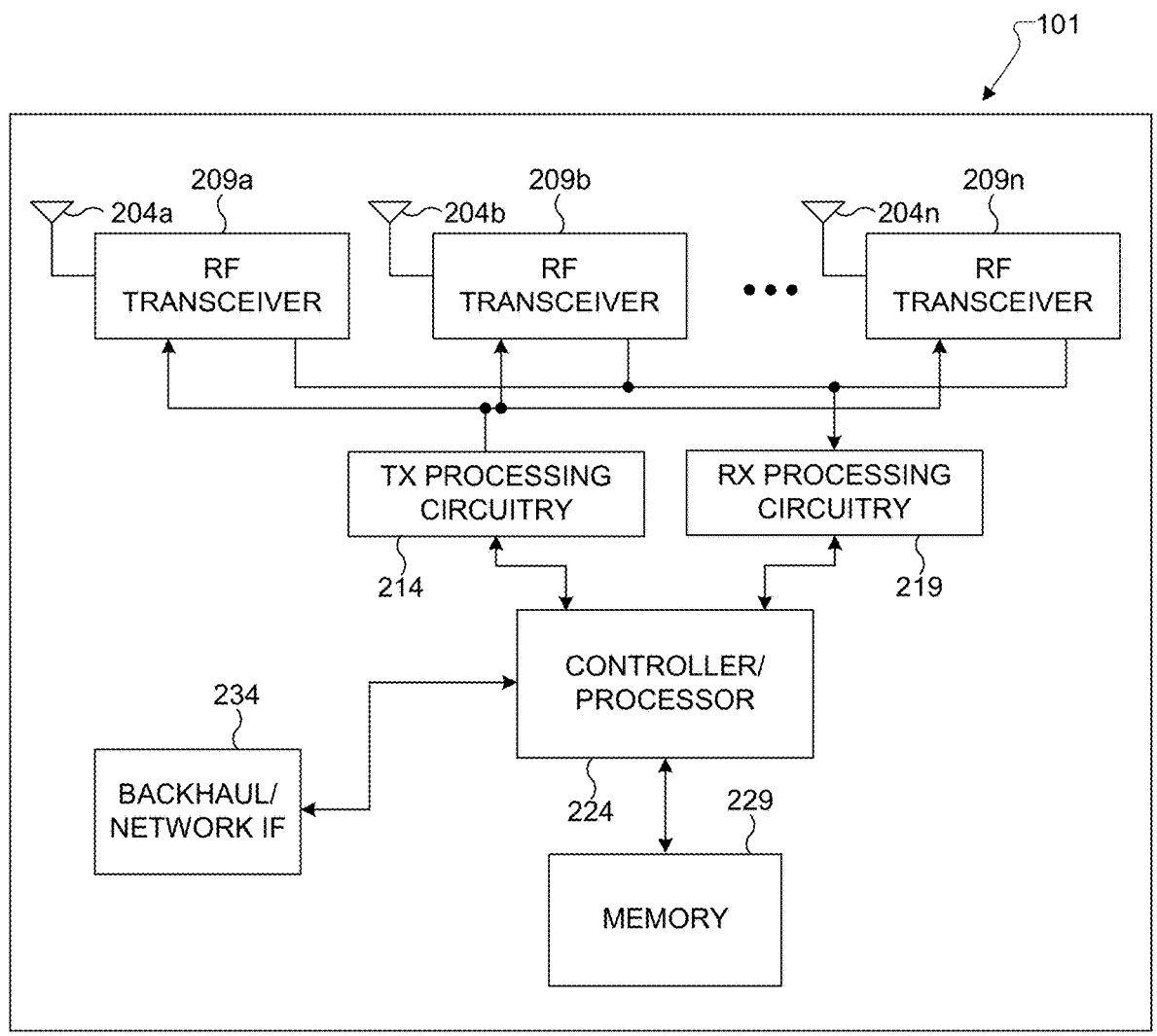
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including determining parameters for TWT operations. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for determining parameters for TWT operations in WLANs (e.g., the TWT interval). Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
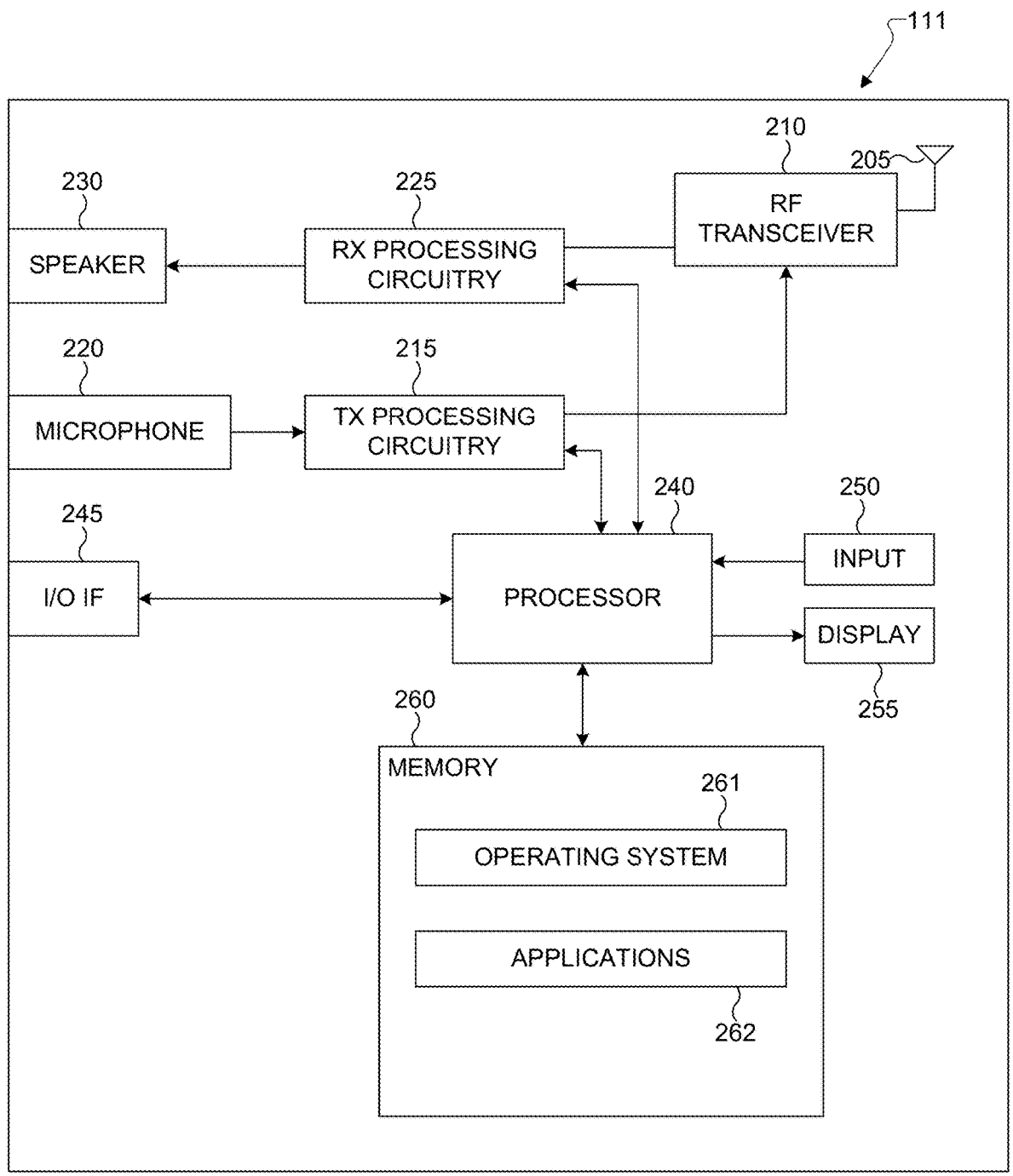
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to determine parameters for TWT operations in WLANs (e.g., the TWT interval). In some embodiments, the controller/processor 240 includes at least one microprocessor or microcontroller.

The controller/processor 240 is also capable of executing other processes and programs resident in the memory 260, such as operations for determining parameters for TWT operations in WLANs. The controller/processor 240 can move data into or out of the memory 260 as required by an executing process. In some embodiments, the controller/processor 240 is configured to execute a plurality of applications 262, such as applications for determining an idle or active state of the WI-FI link, and determining TWT parameters such as the TWT interval for TWT operation. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
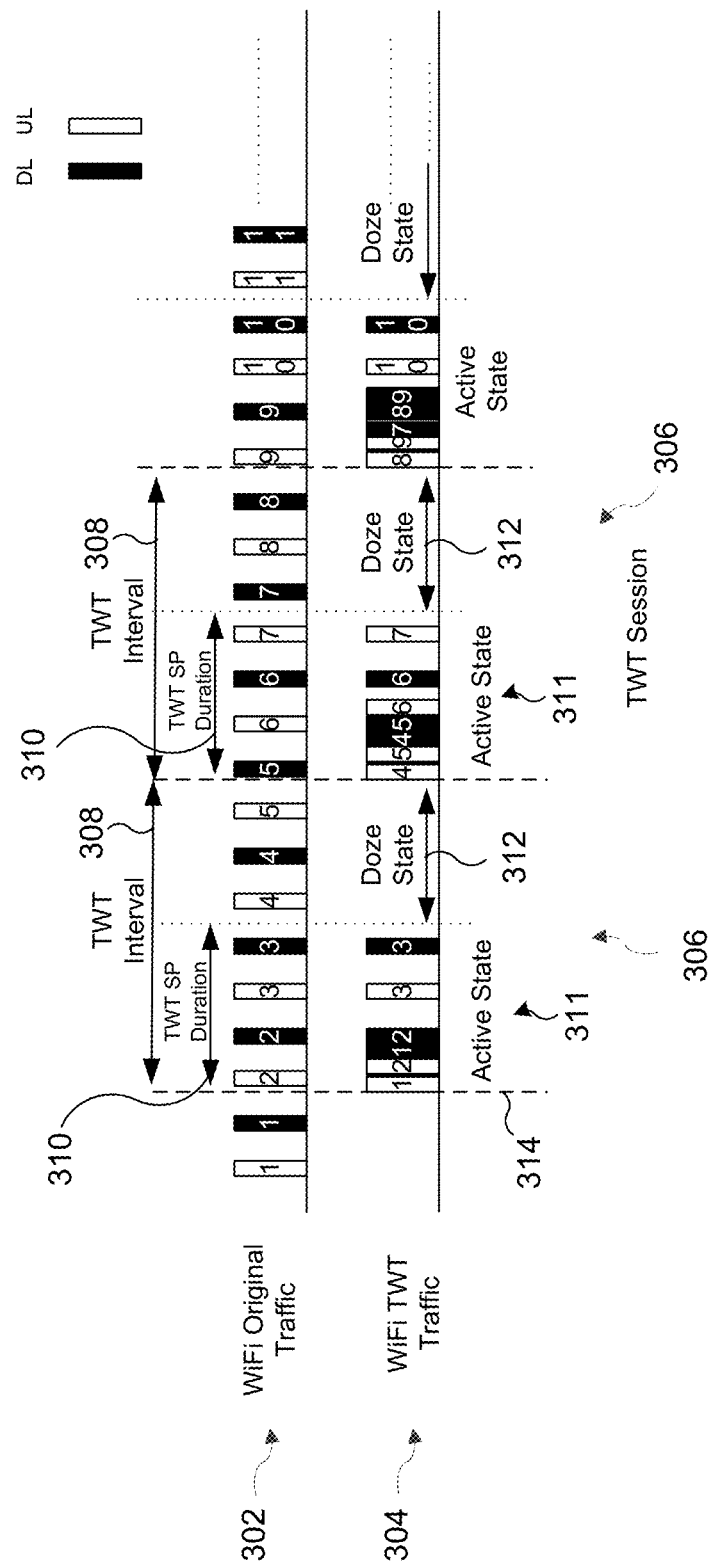
FIG. 3 illustrates a diagram of packet exchange between devices according to embodiments of the present disclosure.

FIG. 3 illustrates a diagram of packet exchange between devices according to embodiments of the present disclosure. For the purposes of this disclosure, the figures will be discussed from the point of view of a STA, which may be a STA 111, but it is understood that it could be any suitable wireless communication device.

FIG. 3 illustrates two scenarios of exchange of uplink (UL) communication packets and downlink (DL) communication packets (which may be collectively referred to as traffic) between an AP and an associated client STA. First, without wake time negotiation between the AP and the STA (e.g., as seen in the top graph 302), and second, with wake time negotiation between the AP and the STA (e.g., in an IEEE 802.11ax system and as seen in the bottom graph 304). In the top graph 302, there is a regular stream of non-buffered traffic between the AP and the STA, with UL packets being interspersed with DL packets. In this scenario (i.e., without wake time negotiation) there is no option for the STA to enter a doze state or a power save state.

By contrast, in the bottom graph 304, wake time negotiation gives rise to consecutive TWT sessions 306. Each TWT session 306 is defined as the time period from the beginning of a TWT interval 308 to the end of the TWT interval 308. Each TWT session 306 includes two states: an active state 311, defined by a TWT service period (SP) duration 310 (during which the STA is awake to communicate with the AP), and a power save state or doze state 312 (during which the STA is not actively awake or communicating with the AP). As a result of wake time negotiation, power efficiency at the STA is improved without adding too much latency or allowing UL or DL packets to be dropped.

In wake time negotiation, the negotiated TWT parameters include the wake interval (e.g., the TWT interval 308 for each TWT session 306), wake duration (e.g. the TWT SP duration 310 for each TWT session 306), and initial wake time or offset (e.g., indicated by the TWT start time 314). These negotiated parameters highly affect latency, throughput, and power efficiency, which are directly related to the QoS (quality of service) a customer experiences. Services with different traffic characteristics can have different TWT parameter configurations for better QoS. Additionally, the TWT configuration should adapt to network and service status variation.

Figure 4:
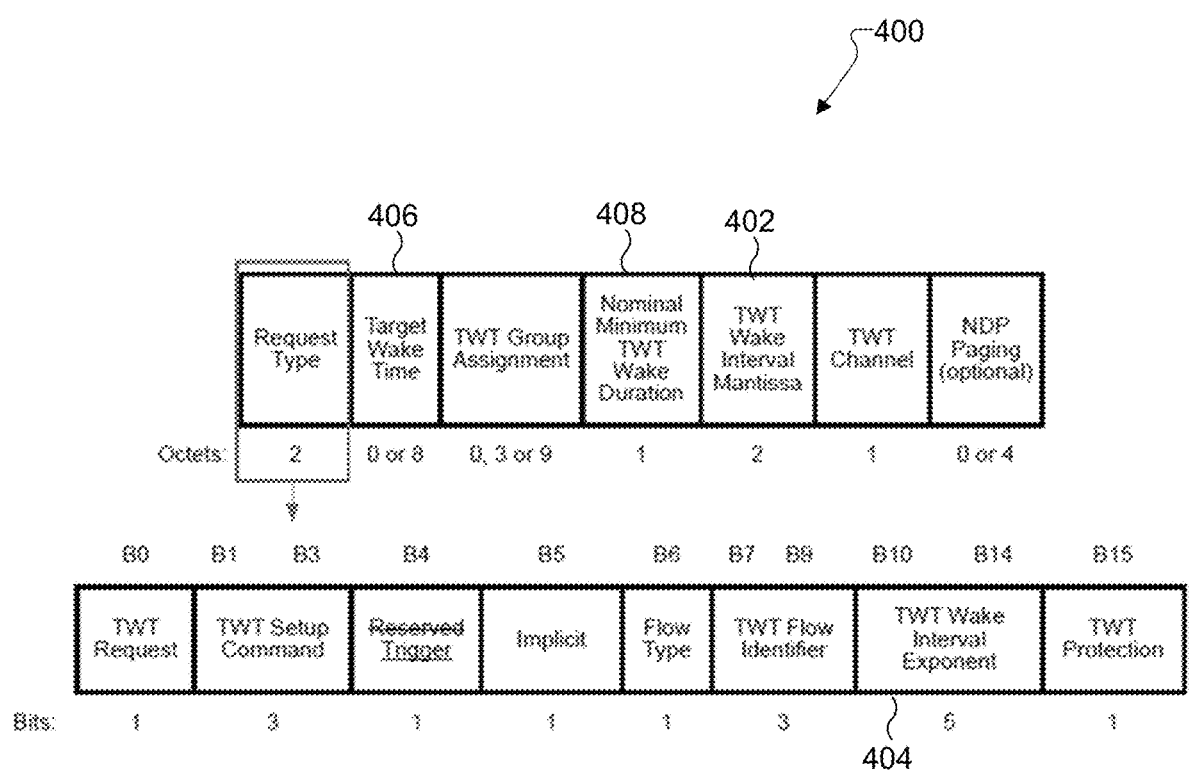
FIG. 4 illustrates an example TWT parameter set field used for TWT parameter negotiation according to embodiments of the present disclosure.

In some embodiments, a TWT parameter set field is used to negotiate the TWT parameters. FIG. 4 illustrates an example TWT parameter set field 400 used for TWT parameter negotiation according to embodiments of the present disclosure. The TWT agreement is initiated by a STA sending a TWT negotiation request to an AP. Once a TWT agreement is made between the AP and the STA, the STA periodically wakes up to communicate with the AP, where the interval between the successive wake times is jointly specified by the TWT wake interval mantissa 402 and TWT wake interval exponent 404 subfields in the TWT parameter set field 400.

The target wake time 406 and nominal minimum TWT wake duration 408 subfields specify, respectively, the first wake time for the TWT agreement, and the time for which the STA must wait before going to doze state when there is no transmitted traffic after a wake time, which is the TWT SP duration 310 in FIG. 3.

Figure 5:
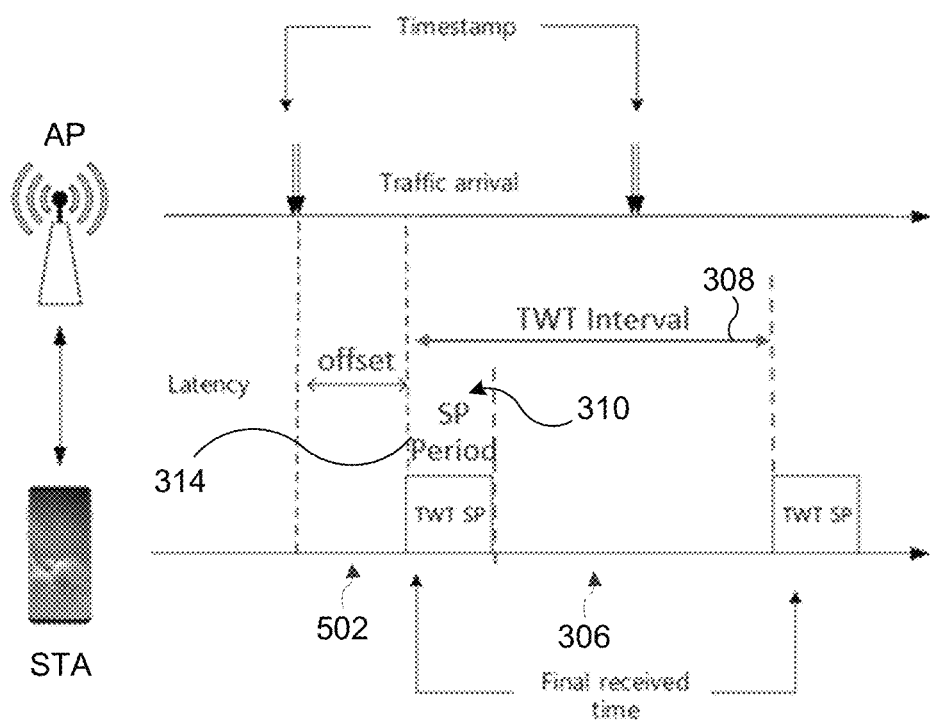
FIG. 5 illustrates an offset in a TWT session according to embodiments of the present disclosure.
Figure 6:
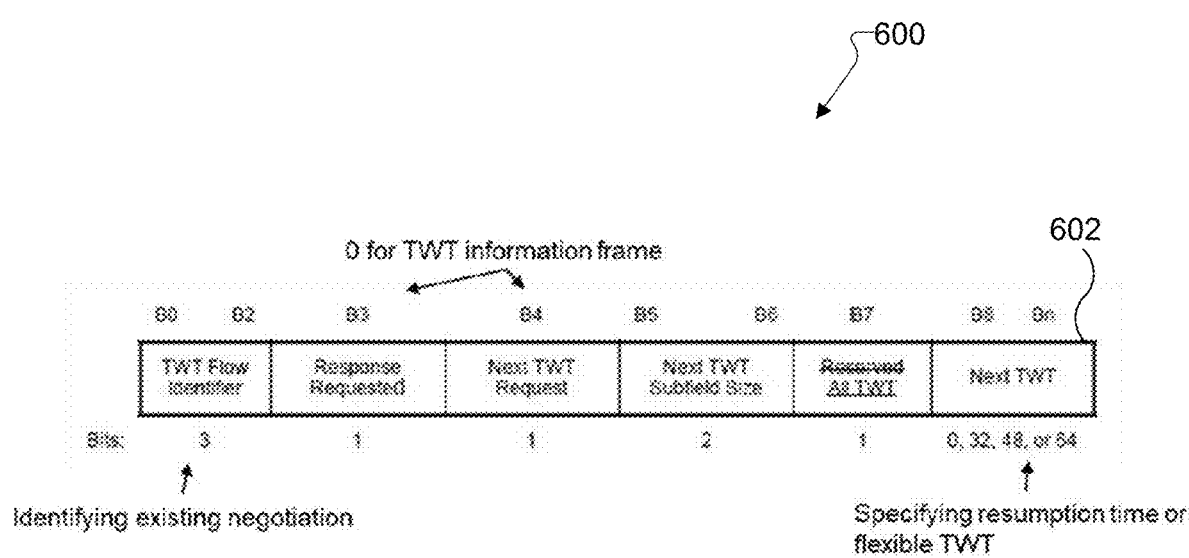
FIG. 6 illustrates an example TWT information frame according to embodiments of the present disclosure.

Other than the wake interval and wake duration, offset is also an important impact factor on the user experience, as the offset could affect the latency. FIG. 5 illustrates an offset in a TWT session according to embodiments of the present disclosure. Different offsets 502 introduce a different additional TWT related latency. TWT interval 308 and offset 502 together define the additional latency introduced by TWT. After TWT negotiation setup, the offset 502 can be adjusted by the field "Next TWT" 602 in the example TWT information frame 600 illustrated in FIG. 6.

Figure 7:
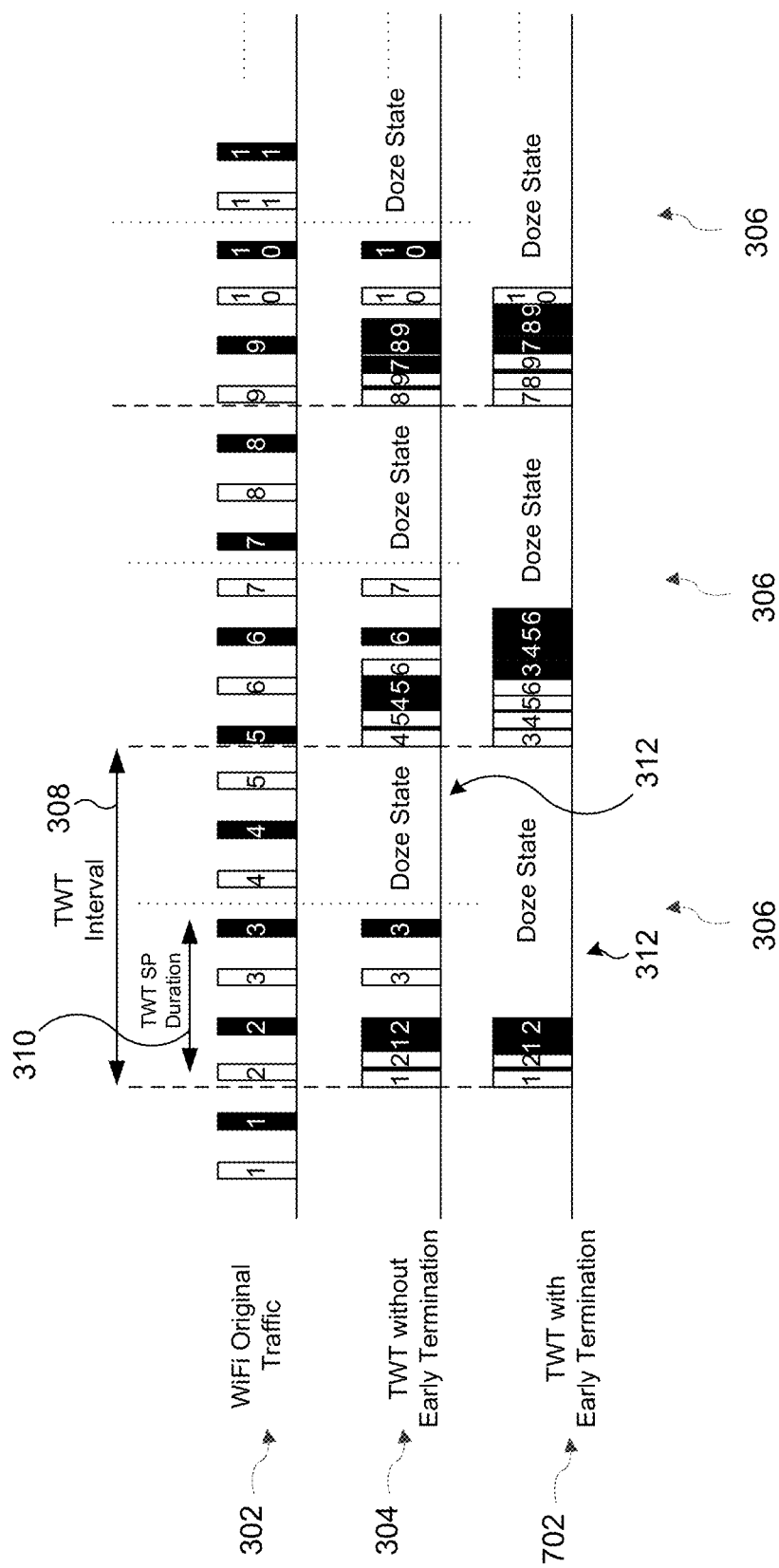
FIG. 7 illustrates an example of early termination of TWT according to embodiments of the present disclosure.

FIG. 7 illustrates an example of early termination of TWT according to embodiments of the present disclosure. In various embodiments, the actual TWT SP duration 310 is dynamically determined in run time by the aforementioned nominal minimum TWT wake duration, and the STA enters the doze state 312 when a packet is received with EOSP (end of service period) bit set to "1", or more data bit set to "0". Depending on whether or not early termination is supported, the time the STA enters the doze state 312 will be slightly different. As shown in graph 702, if the STA supports early termination then once the STA receives a packet with EOSP bit set to "1" or more data bit "0" the STA can enter doze state 312 (although there could be a slight delay between reception of the packet and entering doze state 312). If the STA does not support early termination, then it will wait until the end of the TWT SP duration to enter doze state 312, as shown in graph 304.

As discussed above, the TWT parameters (e.g., TWT interval, TWT SP, etc.) are negotiated in response to the STA sending a TWT negotiation request. Current methods of determining TWT parameters do not account for the characteristic features of an ongoing traffic stream between the AP and the STA. Consequently, they are unable to dynamically adapt to changes in the traffic stream pattern. As a result, methods that can leverage various traffic stream characteristics are needed. Furthermore, in setting up TWT by a non-AP STA, the STA may not have timing information related to downlink packets (e.g., arrival time of downlink traffic). Downlink packet information is affected by the TWT parameters as well as by network conditions which can impact contention times. Consequently, the data that is available at the STA-side has timing information after the application of TWT parameters.

One of the key factors that determines the optimal value of a TWT interval for a given STA is the characteristics of its ongoing traffic flow (e.g., burstiness, traffic statistics such as packet count, byte count, throughput, etc.). The traffic statistic can vary depending on user activity, the application being used, etc.

Figure 8:
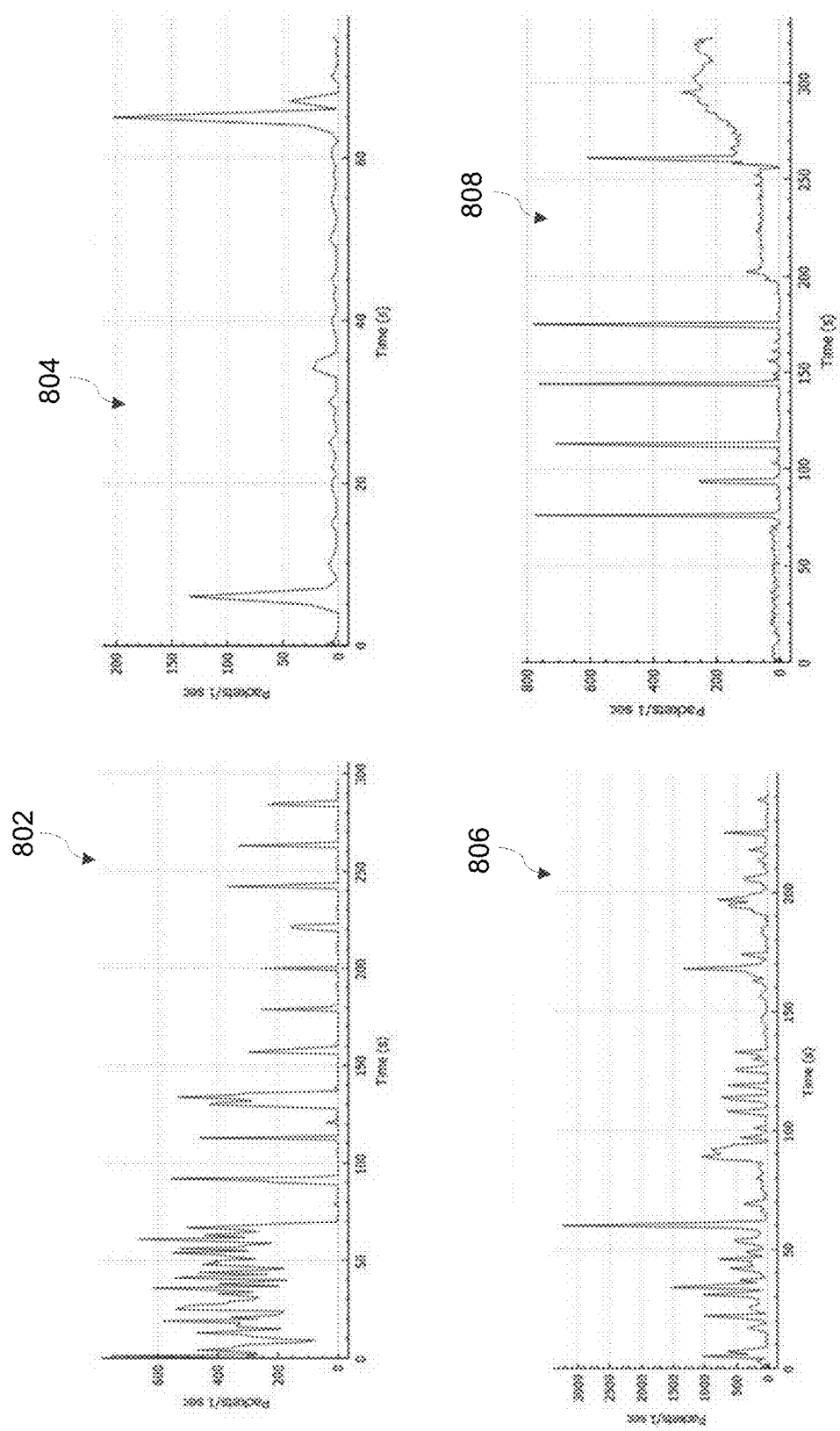
FIG. 8 illustrates example characteristics of traffic flow for applications being run on a STA according to various embodiments of the present disclosure.

FIG. 8 illustrates example characteristics of traffic flow for applications being run on a STA according to various embodiments of the present disclosure. Graph 802 shows the characteristics of traffic flow for an example video streaming application. Graph 804 shows the characteristics of traffic flow for an example gaming application. Graph 806 shows the characteristics of traffic flow for an example online shopping application. Graph 808 shows the characteristics of traffic flow for an example social media application. In each category, it can be observed that there are cases in which the application traffic can be highly bursty and aperiodic, resulting in some periods when the application runs during which no packets are received by the STA. These periods are referred to herein as idle periods.

Thus, with respect to traffic statistics, the state of the STA can be divided into two broad categories: idle and active. In the active state, an application running on the STA is actively generating traffic. As a result, the STA is receiving packets from the AP. The idle state can occur with or without an application generating traffic. In the simple case when no application is running on the STA, no traffic is generated. Examples of this state are cases wherein the user is running a service that does not generate any internet traffic (e.g., offline computation tools, offline games, etc.), or when the user is not performing any activity on the device.

However, the idle state can also arise in a scenario in which the user is running an application on the STA as a result of both traffic burstiness (i.e., traffic patterns comprising periods when the application is generating traffic and periods when the application does not generate any traffic) and idle periods that arise in applications that need a user response. Examples of this can be seen in FIG. 8. For instance, in the case of video streaming application in graph 802, the packet count goes to zero for long periods when the application is running on the STA.

Embodiments described herein below consider inputs available to the STA during TWT operation. While traffic characteristic behavior observed on the AP side could provide valuable insight into setting the appropriate TWT Interval, this information is typically unavailable at the STA side, and accordingly the embodiments of this disclosure assume that the STA does not have this information. Timing information (especially downlink timing information) available at the STA side can be affected by TWT operation. Furthermore, traffic can be a mixture of primary application traffic combined with background traffic.

For the purposes of the below embodiments, two types of STA side timing information formats are considered, although the disclosure is not limited to these two types of input formats. Fine grained traffic information (or per-TWT-SP input) is a record of traffic statistics for each individual SP on the STA. For instance, a record of total packet count for each SP. Coarse grained traffic information (or aggregated TWT SP input) is a record of traffic statistics for a number of SPs combined together. For example, an aggregated record of packet count for SPs that occurred in the last 500 ms.

Figure 9:
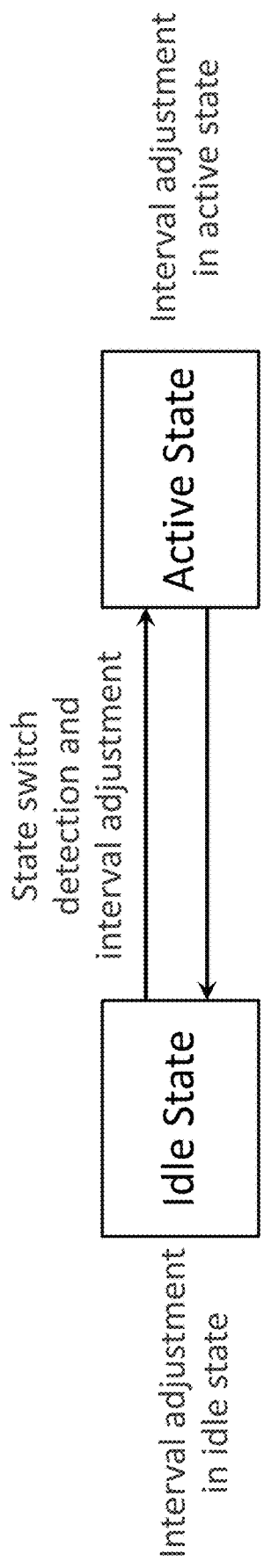
FIG. 9 illustrates an example of an overall process for adjusting a TWT interval based on idle state and active state detection according to various embodiments of the present disclosure.

FIG. 9 illustrates an example of an overall process for adjusting a TWT interval based on idle state and active state detection according to various embodiments of the present disclosure. The idle state provides an opportunity to achieve power savings. As there is no application traffic generated in an idle period, the penalty of increased latency introduced by TWT operation does not apply during this state. Therefore, detection of the idle state can allow for enhancing power savings of the STA by setting a higher TWT interval value. However, if the state of the STA changes from idle to active, the TWT interval value may need to be adjusted, or application performance may degrade due to the increased latency. For instance, if during the idle state the TWT interval value is set to a high value to enhance power savings and the user starts a video chat application (i.e., an application with steady traffic generation), the state change from idle to active needs to be detected so that the TWT interval value can be reduced to a suitable value to reduce latency, thereby avoiding degradation of the application's performance and the user experience.

Figure 10:
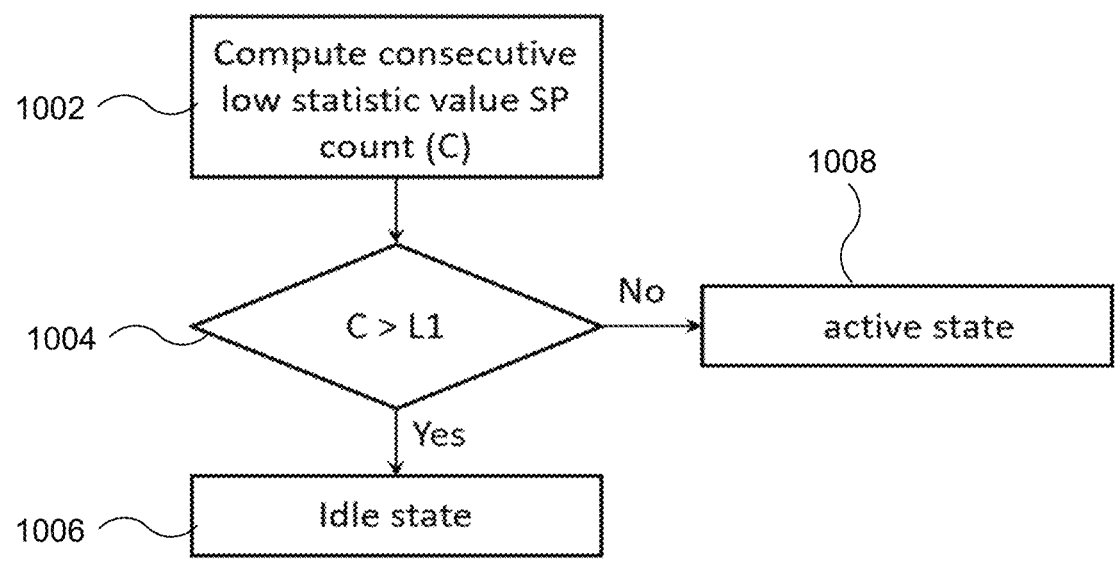
FIG. 10 illustrates an example process for detecting the idle state according to various embodiments of the present disclosure.

FIG. 10 illustrates an example process for detecting the idle state according to various embodiments of the present disclosure. In this embodiment, information on a traffic statistic corresponding to an application being run by a user on the STA is considered for idle state detection. According to this embodiment, a moving window of a traffic statistic $S_t$ over the last K TWT SPs can be considered, where K is a constant (e.g., K=250 SPs). $S_t$ is a statistic reflecting throughput, such as packet count, byte count, or the absolute throughput value itself. Furthermore, $S_t$ can reflect traffic in any of the PHY, MAC, IP, or transport layers. In other embodiments, K can represent the number of times a TWT interval adjustment function is called (e.g., K=3 calls) prior to interval adjustment. In each function call in such an embodiment, the TWT interval adjustment function can be given an input of traffic statistics accumulated over fixed periods of time (e.g., 500 ms).

In the embodiment of FIG. 10, a low statistic value SP is defined as an SP in which $S_t<\theta$, where $\theta$ is a threshold whose value can either be constant (e.g., $\theta=1$) or can be adjusted based on a threshold adaptation algorithm disclosed herein below. A consecutive low statistic SP count (C) is defined as the highest number of consecutive low statistic SPs that occur in the moving window of K SPs. According to this embodiment, the consecutive low statistic SP count can be computed (step 1002) and used for idle state detection.

For example, a threshold L1 can be defined such that when C>L1 (step 1004), an idle state is detected (step 1006). The threshold L1 can be defined as either a constant (e.g., L1=30) or can be adjusted based on the threshold adaptation algorithm disclosed herein below. Alternatively, if C≤L1 (at step 1004), then the active state is detected (step 1008).

Figure 11:
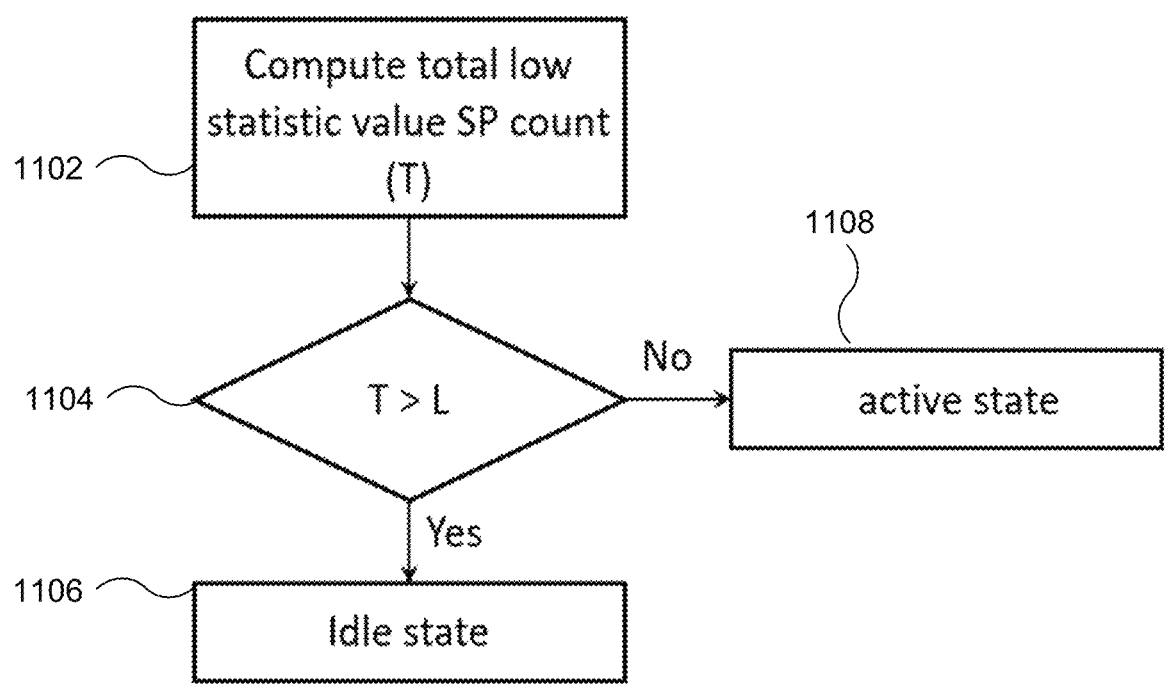
FIG. 11 illustrates another example process for detecting the idle state according to various embodiments of the present disclosure.

FIG. 11 illustrates another example process for detecting the idle state according to various embodiments of the present disclosure. In this embodiment, similar to the embodiment of FIG. 10, information on a traffic statistic corresponding to an application being run by a user on the STA is considered for idle state detection. Similar to FIG. 10, the traffic statistic $S_t$ over the last K TWT SPs can be considered for idle state detection.

As in the embodiment of FIG. 10, a low statistic value SP is defined as an SP in which $S_t<\theta$. Additionally in the embodiment of FIG. 11, a total low statistic SP count (T) is defined as the total number of SPs satisfying $S_t \leq \theta$ within the moving window of K SPs. According to this embodiment, the total low statistic SP count can be computed (step 1102) and used for idle state detection.

For example, a threshold L can be defined such that when T>L (step 1104), an idle state is detected (step 1106). The value of this threshold L can be a constant value (e.g., L=150), or can be adjusted based on the threshold adaptation algorithm described below. Alternatively, if T≤L (at step 1104), then the active state is detected (step 1108).

Figure 12:
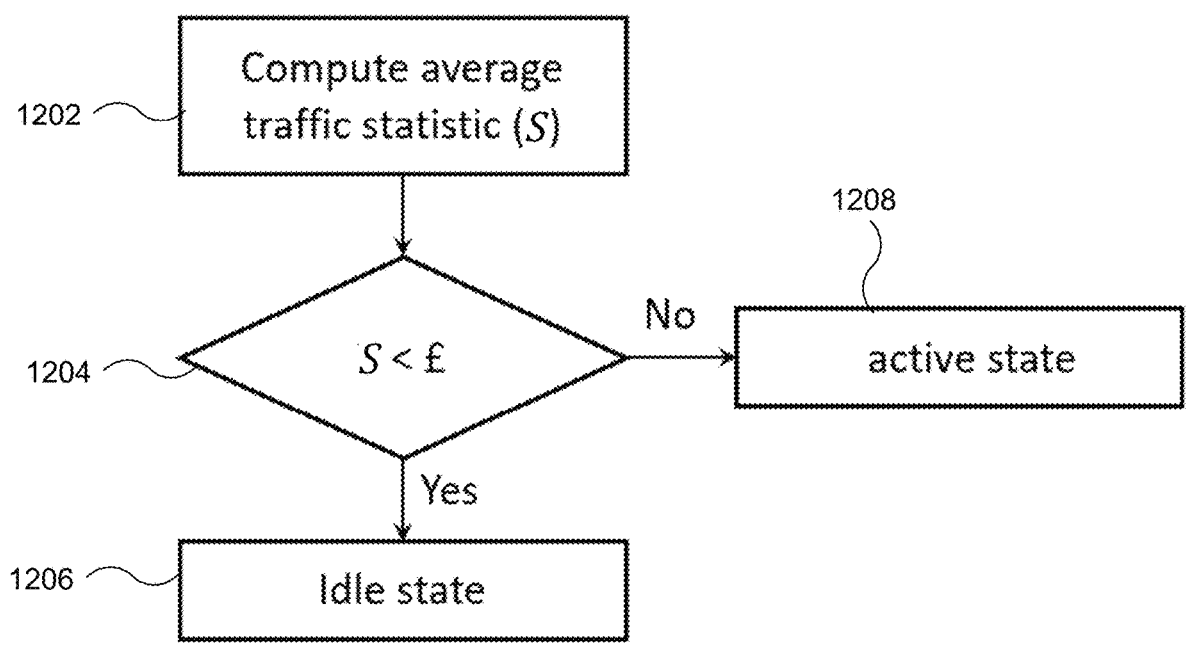
FIG. 12 illustrates another example process for detecting the idle state according to various embodiments of the present disclosure.

FIG. 12 illustrates another example process for detecting the idle state according to various embodiments of the present disclosure. In this embodiment, similar to the embodiments of FIGS. 10 and 11, information on a traffic statistic corresponding to an application being run by a user on the STA is considered for idle state detection. According to this embodiment, S is a statistic reflecting average throughput (e.g., the average of $S_t$ from the above embodiments), such as an average packet count, average byte count, or an average of the absolute throughput value itself. Furthermore, S can reflect traffic in any of the PHY, MAC, IP, or transport layers. In this embodiment, S can be averaged over a certain number of calls to the TWT interval adjustment function (e.g., average of 5 measurements each over a 500 ms duration passed in 1 call). According to this embodiment, the average traffic statistic can be computed (step 1202) and used for idle state detection.

In the embodiment of FIG. 12, a threshold £ can be defined such that if S<£ (step 1204) then the state is considered to be idle (step 1206). Otherwise, the state is considered to be active (step 1208). The threshold £ can be a constant (e.g., 0.2 over 50 SPs) or can be adjusted based on the threshold adaptation algorithm described below.

Figure 13:
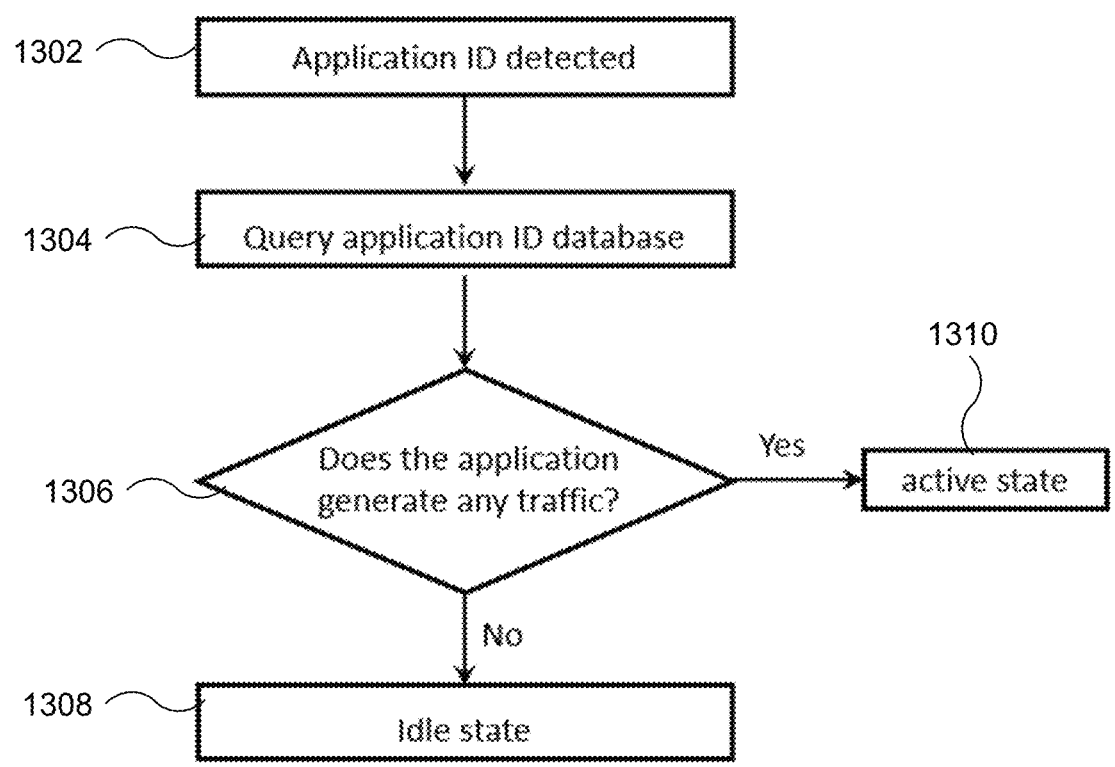
FIG. 13 illustrates another example process for detecting the idle state according to various embodiments of the present disclosure.

FIG. 13 illustrates another example process for detecting the idle state according to various embodiments of the present disclosure. In this embodiment, an application identifier corresponding to an application being run by a user on the STA is considered for idle state detection. For example, in ANDROID operating systems, each application has a unique application ID which uniquely identifies the application on the device. Such an application ID can be used for detection of the idle state.

According to this embodiment, a database or list of application IDs corresponding to applications that do not generate any traffic over the internet (e.g., offline games, offline computation applications, etc.) can be maintained on the STA. When an application is run on the STA, its application ID is detected (step 1302). Consequently, the database/list can be queried/checked (step 1304) to see if the currently running application belongs to one of these applications that do not generate any traffic (step 1306). If the detected application belongs to this list of applications not generating any traffic, then an idle state is detected (step 1308). Otherwise, the application is determined to generate traffic, and the active state is detected (1310). The application ID based idle state detection of this embodiment can either be used on its own or it can be coupled with one of the traffic statistic based idle state detection embodiments of FIGS. 10-12 to further enhance their performance.

As discussed above, when the STA is determined to be in the idle state (e.g., based on one of the embodiments of FIGS. 10-13) and a TWT interval has been increased (as will be discussed further below), it is useful to detect when the state of the STA changes from idle to active in order to avoid degradation of user experience due to unacceptable latency introduced by the increased TWT interval. Embodiments are provided below for detecting an idle state to active state transition.

Figure 14:
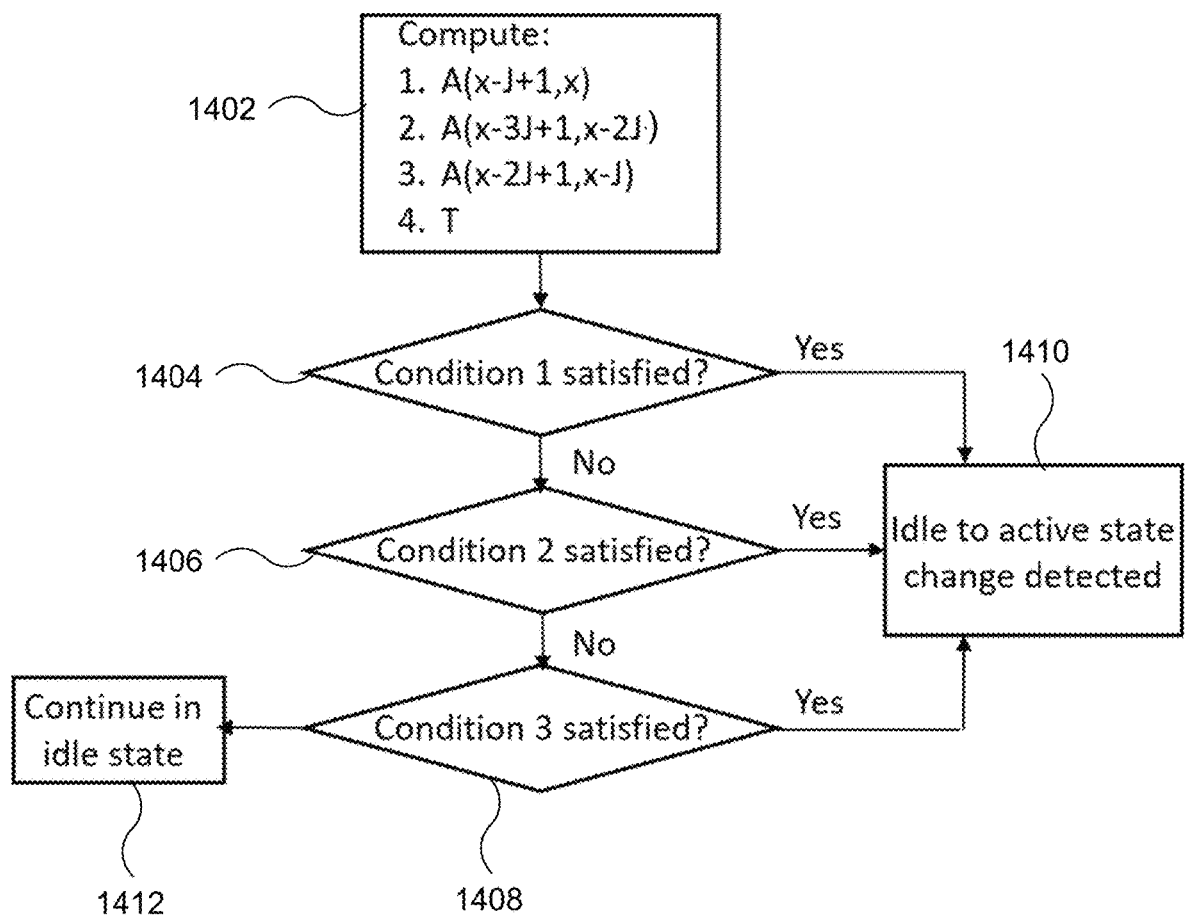
FIG. 14 illustrates an example process for detecting an idle state to active state transition according to various embodiments of the present disclosure.

FIG. 14 illustrates an example process for detecting an idle state to active state transition according to various embodiments of the present disclosure. In this embodiment, patterns in traffic statistics are leveraged to identify when the STA switches from idle to active state. Traffic statistics within a window of J service periods are considered for this embodiment.

In the embodiment of FIG. 14, at step 1402, first a window of the last (i.e., most recent) J SPs is considered. This window is denoted by W(x−J+1, x) where x refers to the current SP and J is a constant (e.g., J=50 SPs). The two expressions in the parentheses indicate the start and end index of the window, respectively. Therefore, in this notation, the first expression x−J+1 denotes the index of the first SP in the window of J SPs and the second expression x refers to the last SP in the window. In the same manner two more windows W(x−2J+1, x−J) and W(x−3J+1, x−2J) which capture J SPs each are considered. Therefore, W(x−J+1, x) captures the last J SPs, W(x−2J+1, x−J) captures the J SPs before that, and W(x−3J+1, x−2J) captures the J SPs before the window W(x−2J+1, x−J).

Next, the traffic statistic $S_t$ is considered for the SPs in these windows. $S_t$ is a statistic reflecting throughput such as packet count, byte count or the absolute throughput value itself (similar to the above embodiments of FIGS. 10-11). $S_t$ can reflect traffic in any of the PHY, MAC, IP, or transport layers. Additionally, the total low statistic SP count (T) is considered. At step 1402, the average of the traffic statistic $S_t$ is computed for each of these windows and is denoted by A(x−J+1, x), A(x−2J+1, x−J), and A(x−3J+1, x−2J). The total low statistic SP count (T) is also calculated at step 1402.

Next, according to this embodiment, to identify the state change from idle to busy the following conditions are considered:

$$A(x-J+1,x) > \delta_{high}$$

and $$A(x-3J+1,x-2J) < \Omega_{low}$$

and $$T > \epsilon \qquad \text{Condition 1:}$$

$$A(x-2J+1,x-J) \times \varphi < A(x-J+1,x)$$

and $$A(x-J+1,x) - A(x-2J+1,x-J) > \psi \qquad \text{Condition 2:}$$

$$A(x-J+1,x) > \tau \qquad \text{Condition 3:}$$

Here, $\Omega_{high}$, $\Omega_{low}$, $\epsilon$, $\varphi$, $\psi$ and $\tau$ are constants (e.g., $\Omega_{high}=1$, $\Omega_{low}=0.5$, $\epsilon=130$, $\varphi=3$, $\psi=10$ and $\tau=5$). If any one of the above three conditions are met (at steps 1404, 1406, and 1408), a state change from idle to active is considered to be detected (step 1410). If none of the three conditions are met, then the device continues in the idle state (step 1412).

As the state switches from idle to active (referred to simply as a state switch below for convenience), it is expected that the average traffic statistic should rise in each subsequent window of SPs. This is the concept involved in the first condition (of step 1404). If the average statistic is below $\Omega_{low}$ in the window W(x−3J+1, x−2J) and is above $\Omega_{high}$ in the window W(x−J+1, x), the state switch is detected at step 1404. While this condition may be sufficient to capture the state switch from idle to active, in some corner cases false triggering may occur using only this condition. To address those cases, Conditions 2 and 3 may be added to further strengthen the state switch detection. Furthermore, Condition 1 itself may be enhanced by adding detection of T>$\epsilon$, as when the state switch occurs, the total low statistic SP count is above a certain threshold since traffic is still quite sparse.

During a state switch, the average statistic in the current window W(x−J+1, x) can be much higher than that in the previous window W(x−2J+1, x−J). This corner case is captured in Condition 2. Note that if average statistic in both these windows is very small, then this condition can be satisfied even though the device is still in the idle state.

Therefore, both the ratio as well as the difference in the statistic in these two windows is considered in Condition 2.

In some cases, there is a sudden jump in the traffic during a state switch. This is captured in Condition 3.

Figure 15:
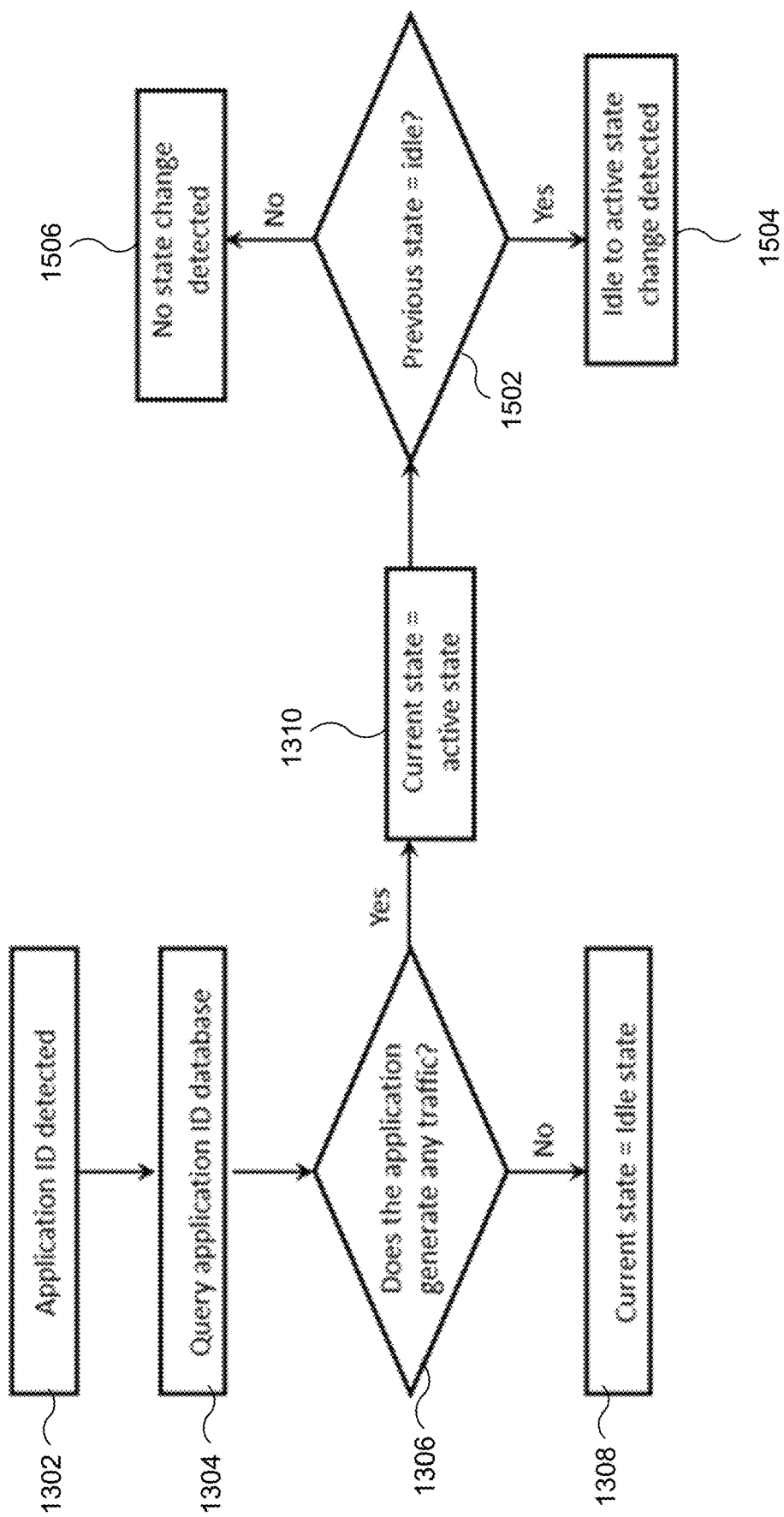
FIG. 15 illustrates another example process for detecting an idle state to active state transition according to various embodiments of the present disclosure.

FIG. 15 illustrates another example process for detecting an idle state to active state transition according to various embodiments of the present disclosure. In this embodiment, the application ID described in the embodiment of FIG. 13 can be used for detection of the active state. According to this embodiment, the current state of the STA and the previous state of the STA are detected based on steps 1302-1310 of FIG. 13. As illustrated in FIG. 15, when the previous state was detected as idle (at step 1502) and the current state is detected as active (at step 1310), a state change from idle to active is considered to be detected (step 1504). If the previous state was detected as active (at step 1502) when the current state is detected as active, then no state change has occurred (step 1506).

Using the above embodiments for detecting the idle state and detecting a switch (or change) from the idle state to the active state, the TWT interval can be adjusted to enhance power savings for the STA. Embodiments are disclosed below for adjusting the TWT interval. The gain provided by increasing the TWT interval is in terms of power savings, however, there is also a penalty in terms of the maximum latency that packets can encounter on the last hop. Consequently, there is a tradeoff between power savings and latency.

Figure 16:
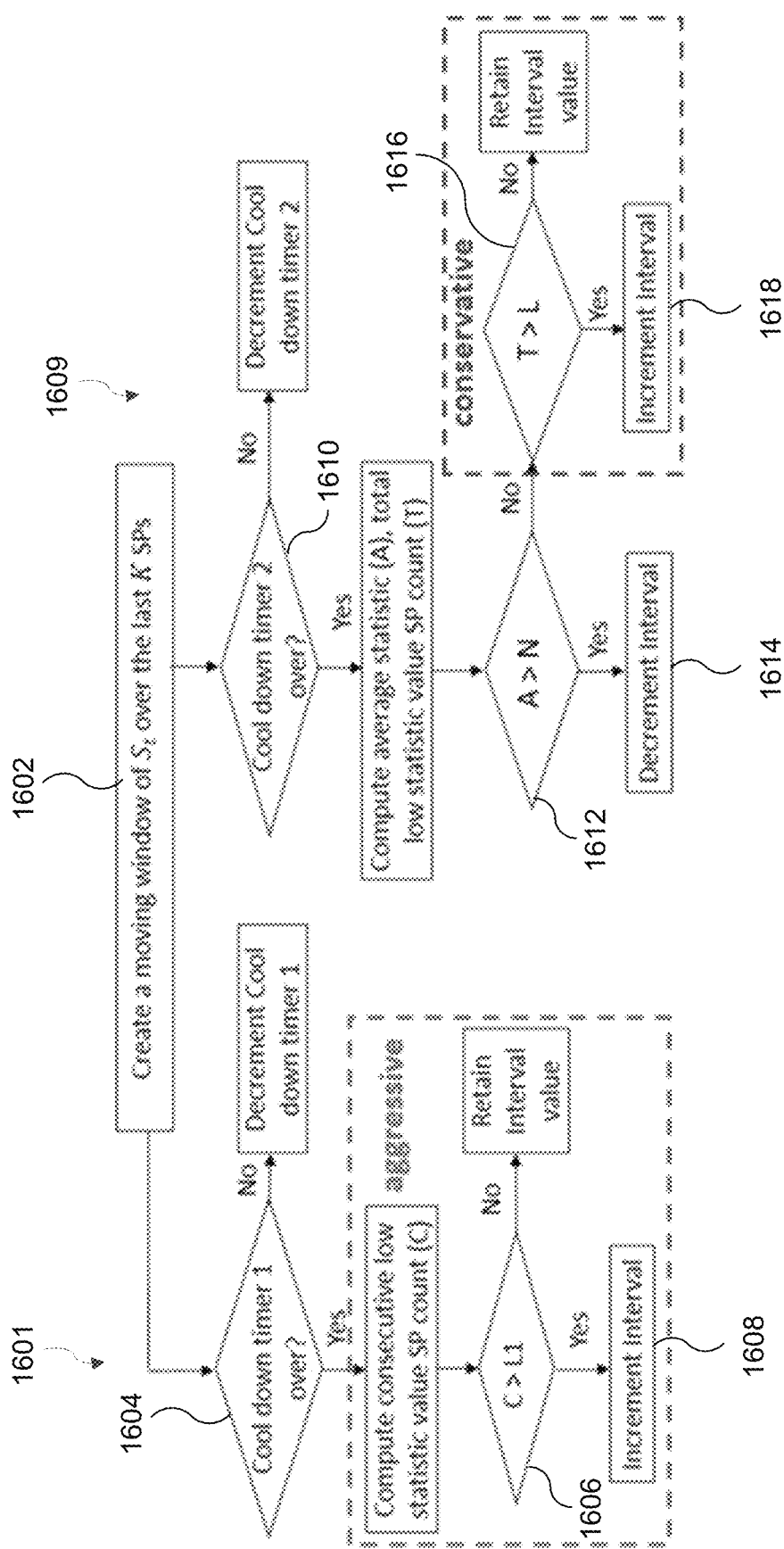
FIG. 16 illustrates an example process for adjusting the TWT interval according to various embodiments of the present disclosure.

FIG. 16 illustrates an example process for adjusting the TWT interval according to various embodiments of the present disclosure. In this embodiment, a traffic statistic corresponding to the service being run by the user on the STA can be considered for TWT interval adjustment. For example, similar to the embodiments of FIGS. 10-11, a moving window of a traffic statistic $S_t$ for the last K service periods is considered where K is a constant (e.g., K=250 SPs), and $S_t$ is a statistic reflecting throughput such as packet count, byte count or the absolute throughput value itself. $S_t$ can reflect traffic in any of the PHY, MAC, IP, or transport layers. In other embodiments, K can represent the number of times a TWT interval adjustment function is called (e.g., K=3 calls) prior to interval adjustment. In each function call in such an embodiment, the TWT interval adjustment function can be given an input of traffic statistics accumulated over fixed periods of time (e.g., 500 ms).

The embodiment of FIG. 16 adjusts the TWT interval value based on three key metrics computed using $S_t$—the consecutive low statistic SP count (C), the total low statistic SP count (T), and the average statistic (A) in the moving window. The definitions of these three metrics are as follows. The low statistic value SP is defined as an SP in which $S_t<\theta$ (as in FIGS. 10-11), where $\theta$ is a threshold whose value can either be constant (e.g., $\theta=1$) or can be adjusted based on a threshold adaptation algorithm disclosed herein below. The consecutive low statistic SP count (C) is defined as the highest number of consecutive low statistic SPs that occur in the moving window of K SPs (as in FIG. 10). The total low statistic SP count (T) is defined as the total number of SPs satisfying $S_t<\theta$ within the moving window of K SPs (as in FIG. 11). The average statistic is the average of all the statistic values in the moving window of K SPs.

In TWT operation, each time a new value of the TWT interval is negotiated between the AP and the STA, an overhead is incurred as various frames are exchanged for setup of the new TWT interval value. Consequently, the frequency with which the TWT interval value changes determines the total amount of overhead incurred. If the overhead is incurred a large number of times, it can have an impact on the system throughput as it consumes some air time. Consequently, it is desirable to reduce the overhead that is incurred due to TWT interval adjustment. As illustrated in the embodiment of FIG. 16, cool down timers may be used to limit the frequency of TWT interval adjustment, and thereby reduce overhead from TWT interval adjustment.

In some embodiments, a cool down timer used for overhead reduction is defined as the number of TWT SPs for which the process waits prior to making the next TWT interval value change. The example process of FIG. 16 includes two main branches. The first branch 1601 represents an aggressive approach to incrementing the TWT interval (e.g., during long idle periods), and the second branch 1609 represents a conservative approach to incrementing the TWT interval (e.g., in a case that involves active traffic). In the embodiment of FIG. 16, a separate cool down timer is associated with each branch. Each cool down timer is decremented after each SP until it expires, at which point the associated branch of the process runs, and the cool down timer is re-initiated and counted down again before its associated branch of the process can run again.

For both branches, a moving window of the traffic statistic $S_t$ over the last K TWT SPs is monitored (step 1602). Then, in the first branch 1601, when cool down timer 1 expires (at step 1604), if C>L1 (at step 1606, where the threshold L1 can be defined as either a constant (e.g., L1=30) or can be adjusted based on the threshold adaptation algorithm disclosed below) then at step 1608 an idle period is detected based on the embodiment of FIG. 10 and the TWT interval (I) is incremented as:

$$I = \left(1 + \frac{G_1^{min(Z, EXP\_LMT)}}{10}\right) * I \quad (1)$$

where Z indicates the consecutive number of times the TWT interval has been incremented via the first branch 1601 (i.e., steps 1604-1608) and $G_1$ is a constant (e.g., $G_1=1.2$). Furthermore, EXP_LMT is a value for controlling the exponent and can be a constant (e.g., EXP_LMT=9). A higher value of C implies that the STA is in the idle state for much of the portion of the moving window. Additionally, if the condition C>L1 is triggered multiple consecutive times, then the STA has been in the idle state for multiple consecutive cool down timer expirations (at step 1604), which implies that the STA is in a long idle period. Consequently, the STA can afford to aggressively increase the TWT interval to save more power. Equation (1) provides this aggressive interval increment, increasing the increment amount on each consecutive idle state detection.

The aggressive interval increment branch (first branch 1601) is targeted at a case when there is a prolonged idle state. For instance, if the user turns off the application and there is no internet activity on the STA. In this case, the latency penalty may not have a severe effect as the background traffic running is usually latency tolerant (compared to application traffic such as voice, video, etc.). In this example, the maximum number of consecutive SPs which have a low traffic statistic will be quite high. Therefore, the STA can aggressively increment the TWT interval in this case without much penalty to try to save as much power as possible.

In the second branch 1609, when cool down timer 2 expires (step 1610), for a threshold value N (which can either be a constant value, e.g., N=1.5, or can be adjusted based on the threshold adaptation algorithm disclosed below), if A>N (at step 1612) then the TWT interval is decremented (at step 1614) as:

$$I = \left(1 - \frac{1}{20}\right) * I \quad (2)$$

Equation (2) provides a 5% decrement in the TWT interval value each time a need for decrement is detected via the second branch 1609. The decrement decision of steps 1612 and 1614 leverages the idea that the average traffic statistic provides an indication of the latency incurred due to the TWT interval. More packets received implies that there is more buffered data which incur a latency. Therefore, according to this embodiment, to reduce the latency the value of the TWT interval is reduced.

If A≤N at step 1612, and if T>L (at step 1616, where the threshold L can be a constant value (e.g., L=150), or can be adjusted based on the threshold adaptation algorithm described below) the TWT interval is incremented (at step 1618) as:

$$I = \left(1 + \frac{G_2^{\frac{T}{L}}}{10}\right) * I \quad (3)$$

where $G_2$ is a constant (e.g., $G_2$=1.2). In some embodiments, the exponent of $G_2$ can be limited to a maximum value to control the size of the exponent. For example, the EXP_LMT value of Equation (1) can be used in Equation (3) to limit the exponent of $G_2$ to be $$\min\left(\frac{T}{L}, \text{EXP\_LMT}\right),$$

where EXP_LMT can be a constant value (e.g., EXP_LMT=9). In this way, whenever the method of FIG. 16 increments the TWT interval, limits are imposed on the interval increment value.

The conservative interval increment branch (branch 1609) is targeted at a case that involves active traffic. For instance, consider applications that have a bursty traffic pattern (for example, as illustrated in FIG. 8). In case such an application is run, there is an opportunity to save power as there are indeed some idle times in traffic. However, any TWT interval increment should be done conservatively as traffic is still active, otherwise a penalty in terms of latency can be incurred. In this case, the maximum number of consecutive SPs with a low traffic statistic may not be that high as there could be some SPs with a high traffic statistic in between two or more SPs with low traffic statistics. However, the total number of low statistic SPs (which do not have to be consecutive) can still be high. Accordingly, this is used as a condition to trigger a conservative interval increment in branch 1609.

As discussed above, the cool down timers in FIG. 16 are meant to reduce the number of times a TWT interval increment is performed. Each time the TWT interval value is re-negotiated between the AP and the STA, there is some overhead incurred. To reduce this overhead, each branch (1601 and 1609) that increments the TWT interval value has a cool down timer. The cool down timer also provides control of the overall behavior of the algorithm. For instance, if the algorithm is desired to be overall aggressive, then the value of cool down timer 1 can be set low, and the value of cool down timer 2 can be set high. In that case, the algorithm will frequently check for aggressive interval increment opportunities. However, if the algorithm is desired to be more conservative, then cool down timer 2 can be set to a low value, and cool down timer 1 can be set to a high value. Consequently, the algorithm will rarely attempt aggressive interval increments and most interval increments will be conservative.

In some embodiments, in addition to imposing a maximum limit EXP_LMT (e.g., EXP_LMT=9) on the exponents of $G_1$ and $G_2$ in Equations (1) and (3) above, a limit IncrMax (e.g., IncrMax=20 ms) can be imposed on the overall value of the TWT interval increments computed using Equations (1) and (3). Furthermore, while incrementing the interval, the interval can be upper bounded by a MAX_TWT_INTERVAL value (e.g., MAX_TWT_INTERVAL=100 ms) and lower bounded by a MIN TWT INTERVAL value (e.g., MIN TWT INTERVAL=15 ms). Additionally, the process can initialize the TWT interval with a value of TWT_INTERVAL_INIT (e.g., TWT_INTERVAL_INIT=20 ms).

In some embodiments, to minimize the number of TWT re-negotiations due to changes to the TWT interval, the interval value is only changed if the difference between the modified TWT interval value based on the embodiments described above and the original TWT interval value is greater than a CHANGE_THRESHOLD value multiplied by the original TWT interval value. This ensures that minor fluctuations in the TWT interval do not trigger a negotiation between the AP and the STA. CHANGE_THRESHOLD can be a constant value (e.g., 20%).

Although the above-described Equations (1)-(3) are disclosed as part of the design of one embodiment, the disclosure is not limited by these equations. The goal of the process of FIG. 16 is to provide aggressive and conservative TWT interval increments. Equations (1)-(3) are examples of how to aggressively and conservatively increment the TWT interval values, but other equations could be used with the process of FIG. 16 to achieve this goal.

In some embodiments of the process of FIG. 16, when a state change of the STA from idle to active occurs (for instance, as detected based on the embodiments described in FIGS. 14-15), the TWT interval value can be reset to TWT_INTERVAL_INIT.

Figure 17:
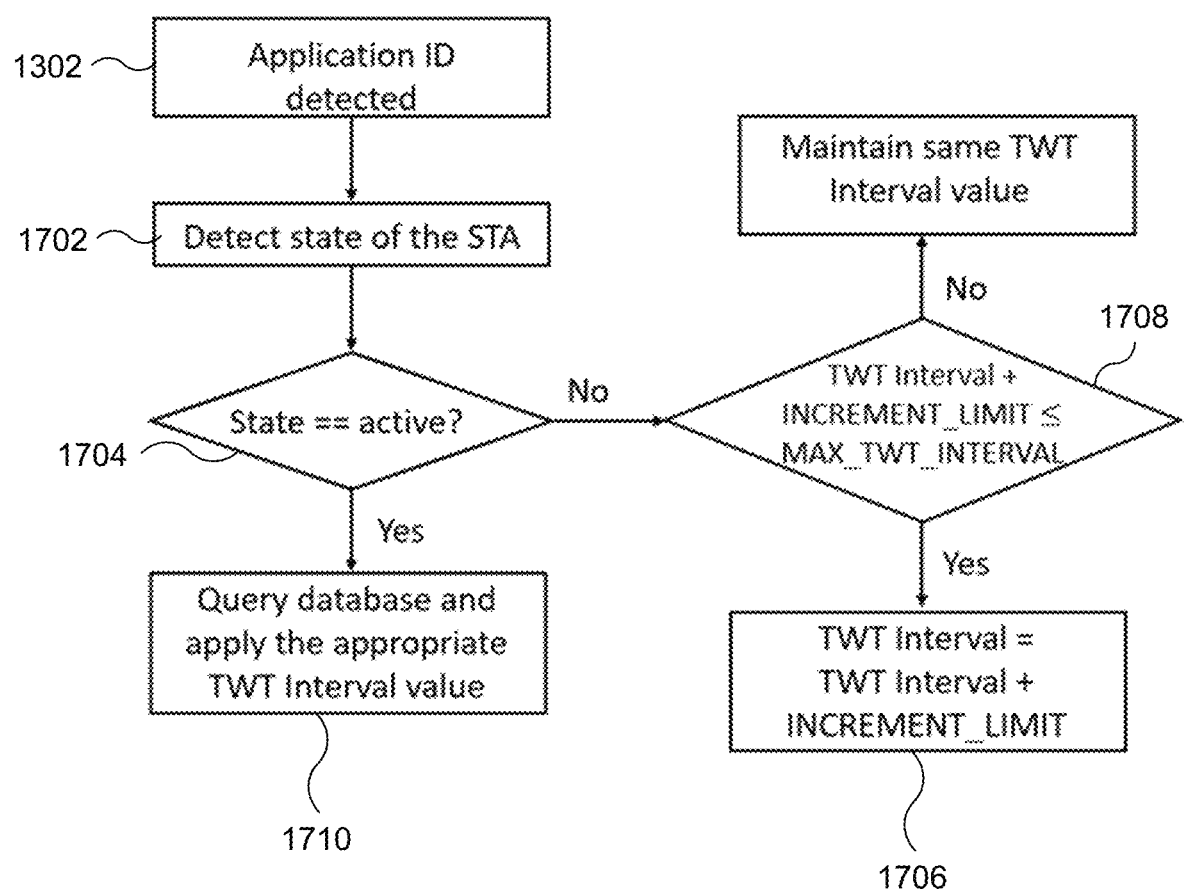
FIG. 17 illustrates another example process for adjusting the TWT interval according to various embodiments of the present disclosure.

FIG. 17 illustrates another example process for adjusting the TWT interval according to various embodiments of the present disclosure. In this embodiment, the application ID can be used for adjusting the TWT interval. According to this embodiment, two cases can arise: based on the application ID, the state of the STA can be detected as either idle or active (e.g., as disclosed in FIG. 13). For example, the state of the STA can be detected at step 1702 as disclosed in steps 1306-1310 of FIG. 13.

In the embodiment of FIG. 17, when an idle state is detected (at step 1704), the TWT interval can be incremented at step 1706 in steps of INCREMENT LIMIT (e.g., 20 ms) until the TWT interval value reaches the MAX_TWT_INTERVAL (e.g., MAX_TWT_INTERVAL=100 ms) as detected in step 1708.

In some embodiments, for cases in which an active state is detected (at step 1704) based on the application ID, a suitable TWT interval value can be associated with each application ID such that the user experience does not deteriorate when the TWT interval value associated with the application ID is applied. These TWT interval values can be associated with the application IDs in a database (which may be the same database that is used to determine whether the application generates traffic for idle state detection). In some embodiments, if an application supports multiple traffic types then the TWT interval value associated with its application ID may correspond to the minimum TWT interval value that is suitable for all of the traffic types supported by the application. For instance, applications like WebEx support both video and voice calls. Consequently, a TWT interval value suitable for each traffic type (voice calls and video calls) can be determined. The TWT interval value maintained in the database can be the lesser of the two interval values. According to this embodiment, when a particular application ID is detected, the database can be queried and the TWT interval value from the database can be applied for the particular application ID (at step 1710).

Figure 18:
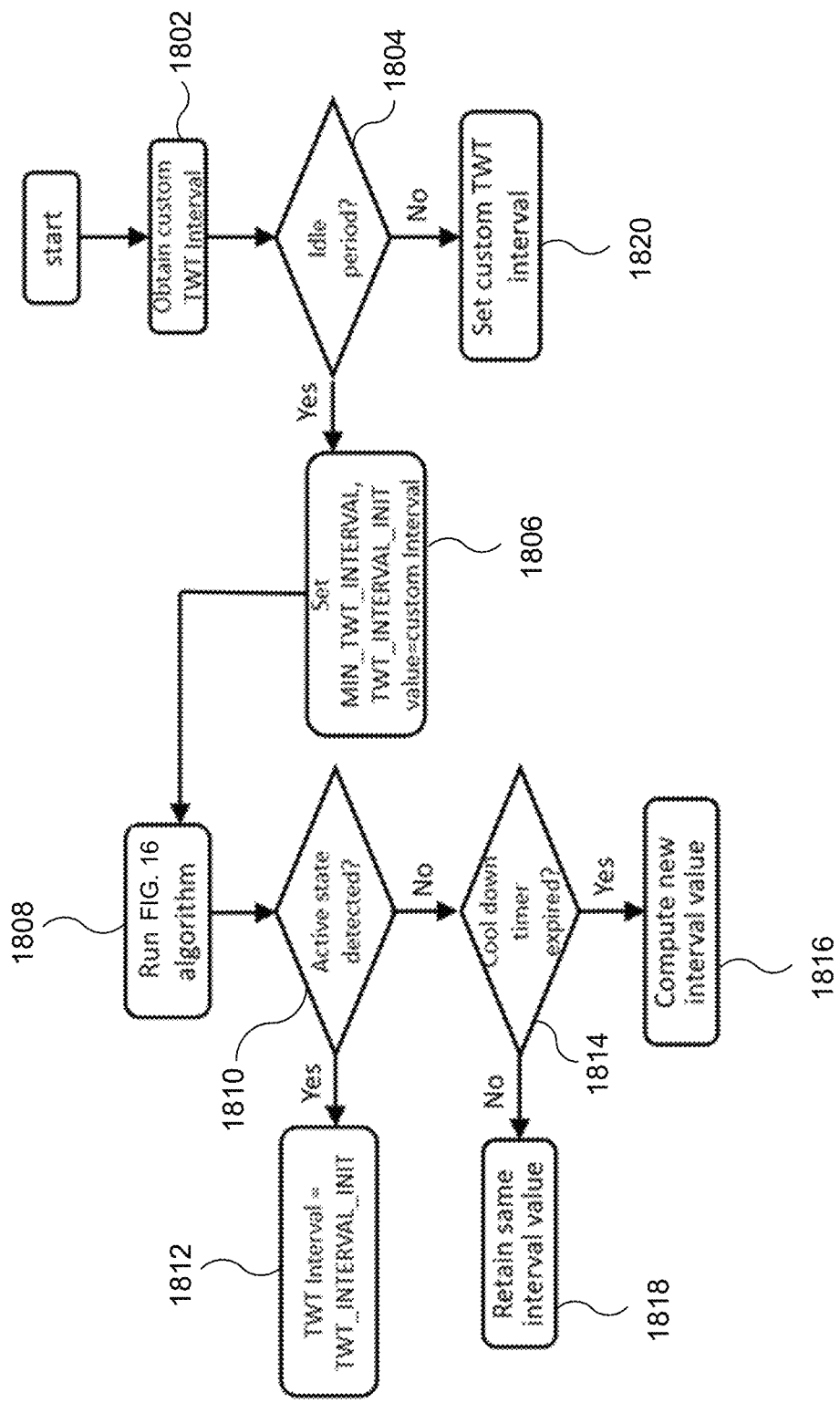
FIG. 18 illustrates another example process for adjusting the TWT interval according to various embodiments of the present disclosure.

FIG. 18 illustrates another example process for adjusting the TWT interval according to various embodiments of the present disclosure. In this embodiment, a hybrid TWT interval adjustment process is disclosed. According to this embodiment, the traffic statistic based interval adjustment process of FIG. 16 can be combined with any TWT interval recommendation method (such as that of FIG. 17) to further enhance the power saving performance of the algorithm. In this embodiment, a custom TWT interval value for an application is used as the minimum TWT interval (to ensure the minimum level of power savings that is possible while running the application), and the traffic statistic based interval adjustment process of FIG. 16 is applied to opportunistically enhance power savings by detecting additional idle periods.

According to the embodiment of FIG. 18, a custom TWT interval value is generated by a TWT interval recommendation algorithm, and is obtained (at step 1802). This TWT interval recommendation algorithm can be the process of FIG. 17 (e.g., the custom TWT interval value that is obtained can be associated in a database with the application ID of the primary application being run by the user), or can be any other TWT interval recommendation algorithm.

Once a custom TWT interval value is obtained, according to this embodiment, the state of the STA is determined as idle or active (at step 1804). This can be done based on any of the embodiments discussed above in FIGS. 10-13. When an idle state is detected, the MIN_TWT_INTERVAL value described in FIG. 16 can be set to the custom TWT interval value (at step 1806), and the process (or algorithm) of FIG. 16 can be executed (at step 1808). The algorithm of FIG. 16 can detect additional idle states and increase the TWT interval accordingly to further enhance power savings.

The process of FIG. 18 checks for a state change is detected from idle to active state (at step 1810). This can be done based on either of the embodiments discussed above in FIGS. 14-15. If a state change is detected from idle to active state at step 1810, then the TWT interval value is initialized to the custom TWT interval value (at step 1812). In some embodiments, the TWT_INTERVAL_INIT of FIG. 16 is used for this purpose, and is set to the custom TWT interval value at step 1806.

In some embodiments, the state change check of step 1810 can be performed before the cool down timer expiration checks of steps 1604 and 1610 of FIG. 16 while performing the process of FIG. 16 according to step 1808. This is illustrated by steps 1814-1818. For example, step 1814 represents the cool down timer expiration checks of steps 1604 and 1610 of FIG. 16, block 1816 represents the TWT interval adjustment computation steps 1608, 1614, and 1618 of FIG. 16, and step 1818 represents the cases in which the conditions of steps 1606, 1612, and 1616 of FIG. 16 are not fulfilled.

As a result, in the event of idle state detection, the above embodiment of FIG. 18 can provide further power savings compared to the savings already provided by the TWT interval recommendation algorithm that generated the custom TWT interval value at step 1802. Meanwhile, when the idle state is not detected at step 1804, the custom TWT interval value obtained at step 1802 is simply applied (at step 1820).

The various embodiments disclosed herein above include a number of threshold values. As discussed above, these threshold values may be adaptive. For example, the threshold values may be adjusted in run time based on traffic statistics.

Figure 19:
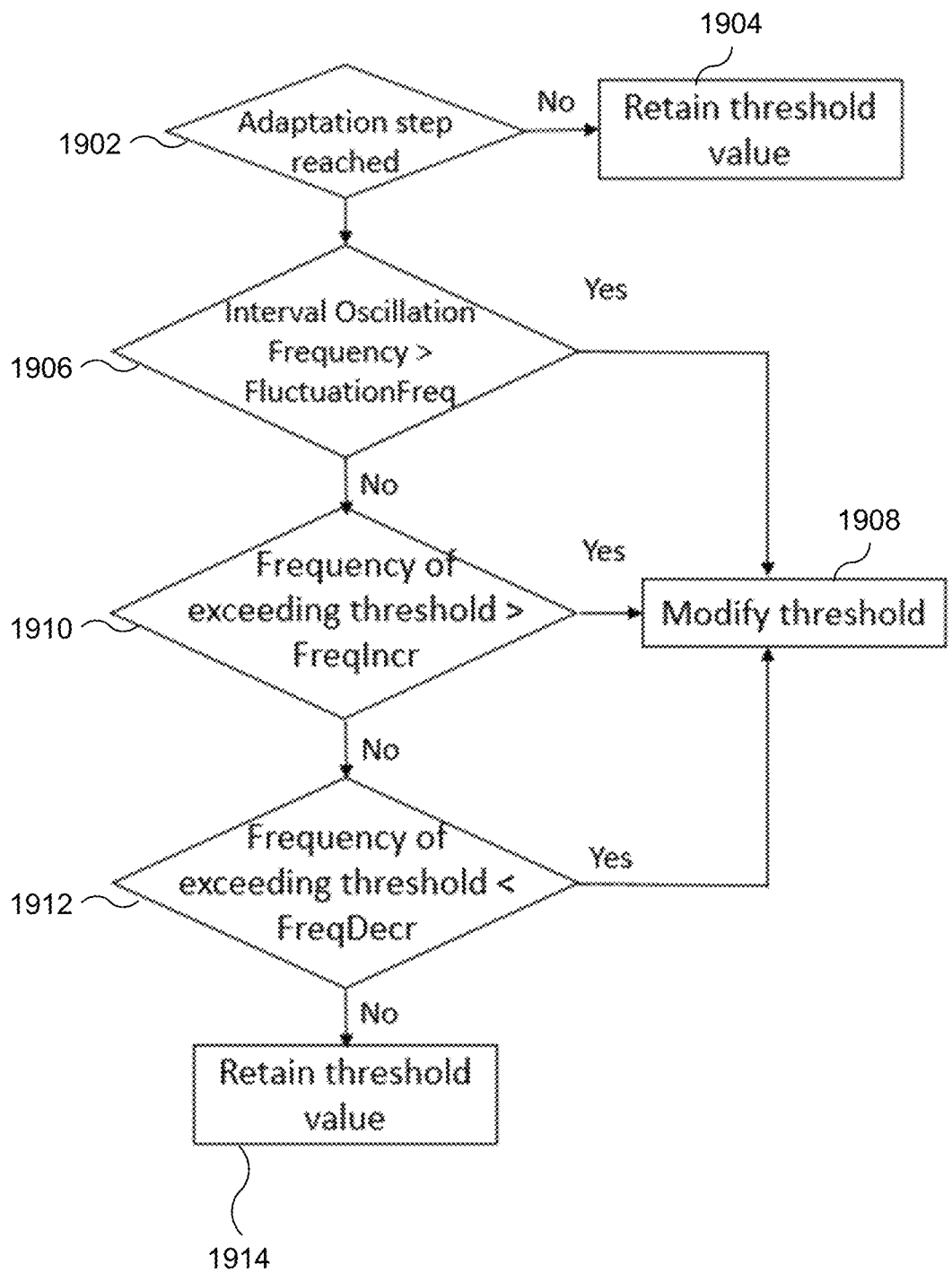
FIG. 19 illustrates an example process for adjusting the values of the thresholds according to various embodiments of the present disclosure.

FIG. 19 illustrates an example process for adjusting the values of the thresholds according to various embodiments of the present disclosure. This process can be referred to as an adaptation algorithm. In the below disclosure, the term adaptation step refers to the number of TWT SPs that the algorithm waits before adapting the value of the threshold parameter. The adaptation step is a constant value (e.g., adaptation step=1000 SPs). Accordingly, at step 1902 the process checks (e.g., after each SP) whether the adaptation step value has been reached, and if not, the existing threshold value is retained (at step 1904).

At step 1906, the process checks whether the number of times the TWT interval oscillates within a number G of SPs exceeds the value FluctuationFreq. If so, the value of the threshold is modified (at step 1908). Here G is a constant (e.g., 260 SPs) and FlucationFreq is a constant as well (e.g., FluctuationFreq=3).

In this embodiment, the term frequency of exceeding threshold is defined as the number of times the threshold value is exceeded by its corresponding parameter before the adaptation step is reached. For instance, if the value of N is adapted using this algorithm, the algorithm would check how many times the condition A>N is satisfied within the window of an adaptation step. The value of the adaptation step may be different for different thresholds. If the frequency of exceeding the threshold is determined (at step 1910) to be greater than the value FreqIncr (e.g., FreqIncr=25) or determined (at step 1912) to be less than the value FreqDecr (e.g., FreqDecr=5), the threshold is modified (at step 1908).

If none of the conditions of steps 1906, 1910, or 1912 are satisfied, then the existing threshold value is retained (at step 1914). The process then waits for an adaptation step before running again.

In various embodiments, two methods may be used to increment the threshold at step 1908. The first method is to increment it by a constant value (e.g., increment=2). The second method is to set it to the maximum of the corresponding parameter values over the adaptation step plus one. For instance, for adapting N with an adaptation step of 1000 SPs, the value of N would be set to the maximum value of $S_t$ in the previous 1000 SPs plus 1.

As an alternative to the TWT interval adjustment process of FIG. 18, an autoregressive integrated moving average (ARIMA) statistical time series forecasting model can be used to estimate the TWT interval, as well as the TWT SP duration. The algorithm consists of two stages. In the first stage, the packet transmission time stamps for downlink and uplink are considered. These packet time stamps are processed to create a number of time series data sets. In the second stage, these time series data sets are provided as an input to an ARIMA model. The outputs provided by the model are used to estimate the interval and SP duration.

In the first stage, two bounds on the TWT interval are considered. The first is a minimum bound denoted by $I_{MIN}$ and the second is a maximum bound denoted by $I_{MAX}$. For the sake of simplifying the interval value search, M levels between $I_{MIN}$ and $I_{MAX}$ are considered. Therefore, the search space represented by $X_I$ is the set:

$$X_I = \{I_{MIN}, I_{MIN} + \Delta, I_{MIN} + 2\Delta, I_{MAX}\}$$

where $\Delta = (I_{MAX} - I_{MIN})/M$ (e.g., $I_{MIN} = 20$ ms, $I_{MAX} = 100$ ms and M=8).

Next, a historic data set of the traffic stream is considered, where the historic data set comprises packet transmission times on the downlink and uplink for a time period denoted by B (e.g., B=500 ms). The following steps are then repeated for each value in $X_I$.

Step 1: Choose a value from $X_I$. Let the chosen value be denoted by $I_i$.

Step 2: Divide the data set for the last B amount of time into slots of length $I_i$. It is noted that B may not be a multiple of L. In such a case, the previous M amount of time is considered, where M=floor(B/$I_i$)·$I_i$, and this amount of time is divided into slots of length $I_i$ each.

Figure 20:
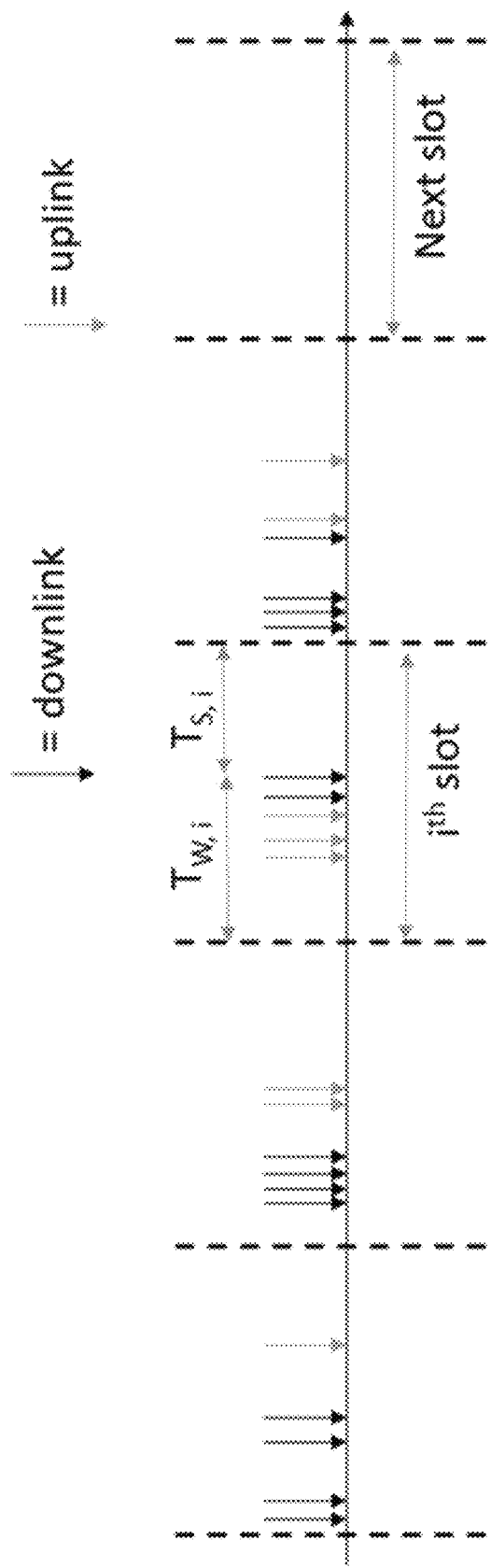
FIG. 20 illustrates an example of time slot division for an autoregressive integrated moving average (ARIMA) statistical time series forecasting model according to various embodiments of the present disclosure.

Step 3: Each slot is further divided into two time periods. The first time period is a wake time, denoted by $T_{W,i}$, which is the duration from the start of the $i^{th}$ slot to the reception end time of the last packet in the $i^{th}$ slot as shown in FIG. 20. The second time period is the sleep time, denoted by $T_{S,i}$, which is the time from the end of reception of the last packet to the end of the $i^{th}$ slot. $T_{W,i}$ is computed for each slot. The values of $T_{W,i}$ for all the slots together constitute one time-series data set referred to as $X_T$. Therefore, $X_T$ is represented as:

$$X_T = \{T_{W,1}, T_{W,2}, T_{W,3} \ldots\}$$

Step 4: Next an ARIMA(p, d, q) model is developed. Here, p is the order of autoregressive terms, d is the order of differentiation, and q is the order of moving average terms. Next, the $X_T$ is divided into two parts. The first part is used to perform a grid search to find the values of the model hyper-parameters p, d, and q, and the second part is used for testing. As an example, two thirds of the set $X_T$ can be used for grid search and one third of the set can be used for testing. Using grid search, hyper-parameters that lead to the lowest root mean squared error (RMSE) on the test set are chosen.

Step 5: Following this, the previous 'max(p, d, q)' number of values from $X_T$ are provided as an input to the ARIMA(p, d, q) model. The output from the model is the wake time for the next slot. As mentioned above, the slots are of fixed length $I_i$ (chosen in step 1). Next, the ratio of the predicted wake time to the slot duration is computed as $T_{W,predicted}/I_i$, where $T_{W,predicted}$ is the wake up time prediction for the next slot.

The above steps are repeated for each element of $X_I$ to get M wake time values for their corresponding M TWT interval values. For each of these M values, the ratio of the predicted wake time to the corresponding interval value is computed. The interval value which leads to a maximum value of this ratio is selected as the final TWT interval value. Here, the TWT interval value with the maximum value could lead to the most predictable traffic. Intuitively, this is because this TWT interval follows the burst of the traffic best.

Figure 21A:
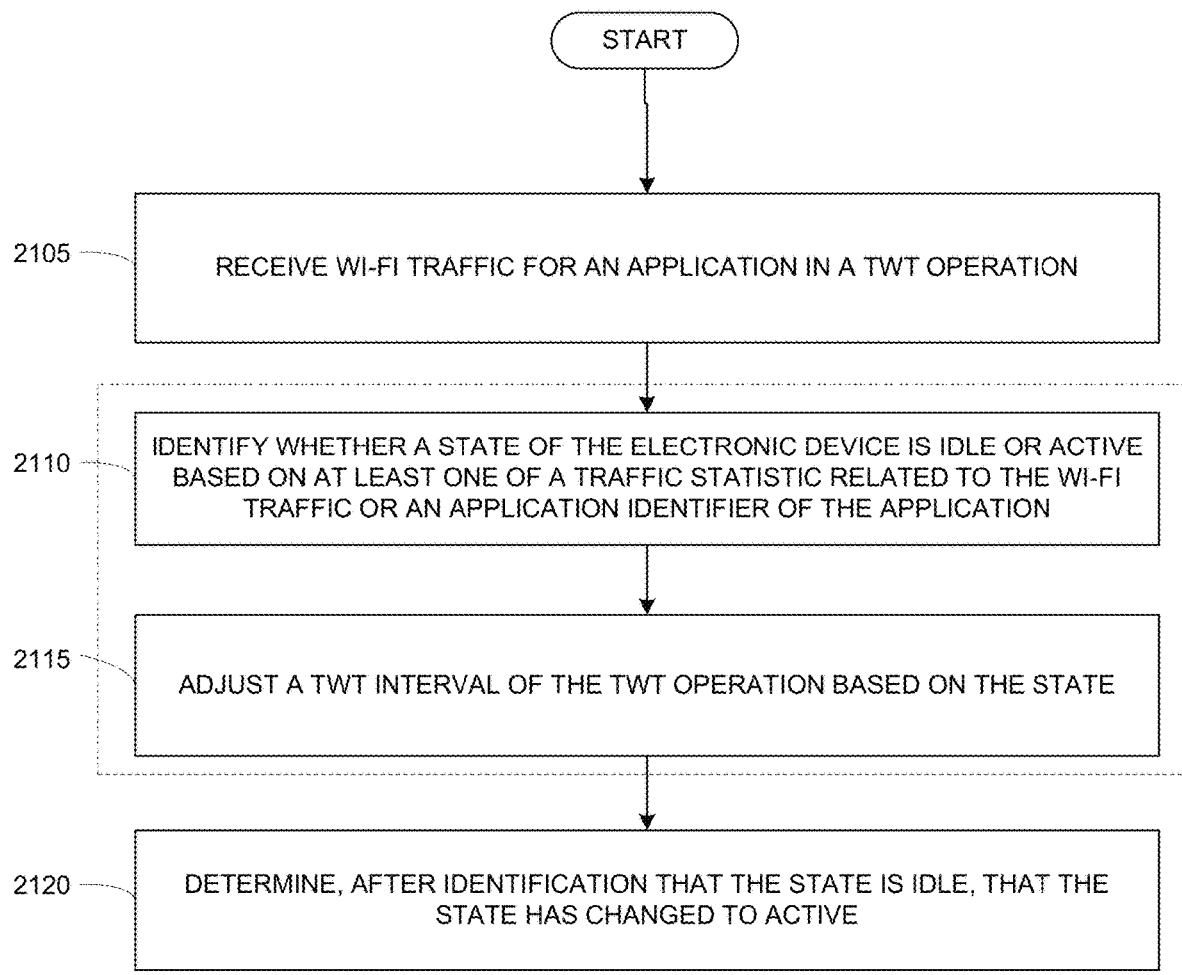
FIGS. 21A-21C illustrate example processes for adaptively updating a TWT interval according to various embodiments of the present disclosure.
Figure 21B:
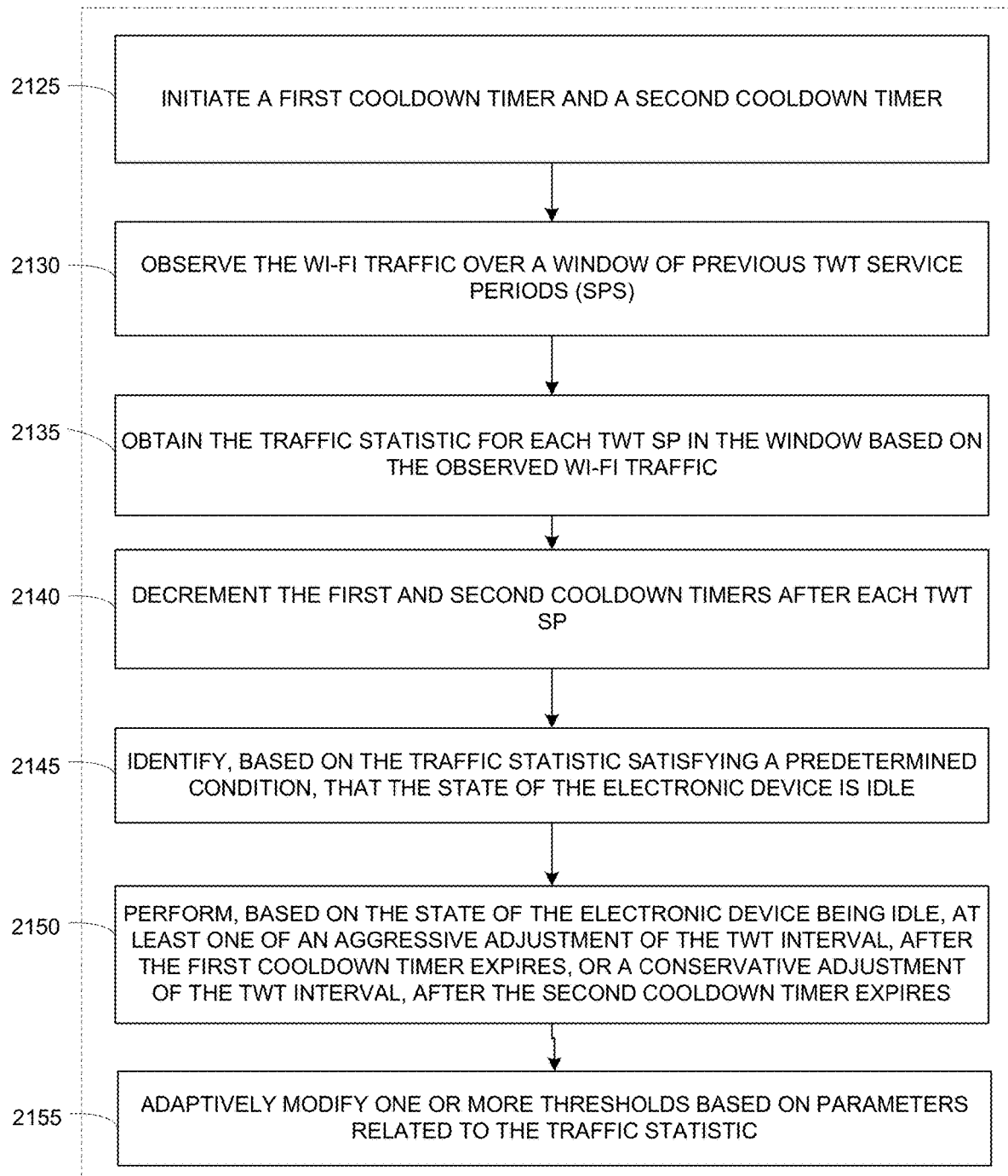
Figure 21C:
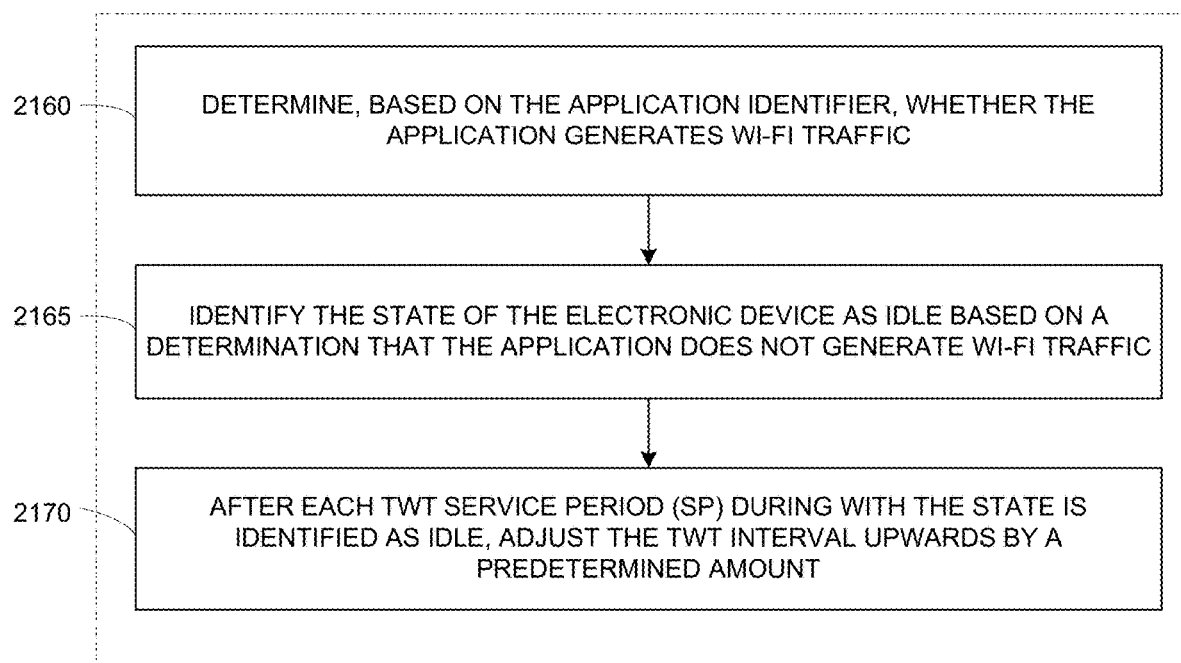

FIGS. 21A-21C illustrate example processes for adaptively updating a TWT interval according to various embodiments of the present disclosure. For convenience, the process of FIGS. 21A-21C is discussed as being performed by a communication device that is a WI-FI STA, but it is understood that a communication device that is a WI-FI AP can perform the process, as can any other suitable electronic device. For ease of explanation, the process is assumed to be performed by the processor of the wireless communication device unless otherwise stated.

Referring to FIG. 21A, the process begins with the device receiving WI-FI traffic for an application in a TWT operation (step 2105). For example, a transceiver of the device may receive the traffic.

Next, the device identifies whether a state of the electronic device is idle or active based on at least one of a traffic statistic related to the WI-FI traffic or an application identifier of the application (step 2110). After the state has been identified, the device adjusts a TWT interval of the TWT operation based on the state (step 2115). Embodiments of steps 2110 and 2115 for state identification based on the traffic statistic and based on the application identifier will be further described below with respect to FIGS. 21B and 21C, respectively.

If the state was identified as idle in step 2110, then the device can determine, after identification that the state is idle, that the state has changed to active (step 2120). In some embodiments, the device may determine that the state has changed to active based on a most recent traffic statistic that is observed in a most recent window of previous TWT service periods (SPs) being larger than previous traffic statistics observed in previous windows, or based on the most recent traffic statistic exceeding a threshold. In other embodiments, the device may determine that the state has changed to active upon determination, based on the application identifier, that the application does not generate WI-FI traffic.

Referring now to FIG. 21B, in order to identify the state of the device in step 2110 using the traffic statistic, the device initiates a first cooldown timer and a second cooldown timer (step 2125). These timers may serve to limit the rate at which TWT parameter re-negotiation is performed based on the TWT interval adjustment method, and may thereby reduce overhead associated with the TWT parameter re-negotiation.

Next, the device observes the WI-FI traffic over a window of previous TWT service periods (SPs) (step 2130). The device then obtains the traffic statistic for each TWT SP in the window based on the observed WI-FI traffic (step 2135). Additionally, after each TWT SP, the device decrements the first and second cooldown timers (step 2140).

After the device has obtained the traffic statistics, the device may identify, based on the traffic statistic satisfying a predetermined condition, that the state of the electronic device is idle (step 2145). Conversely, if the traffic statistic does not satisfy the predetermined condition, then the device may identify that the state is active.

When the state is identified to be idle at step 2145, then in order to perform the adjustment of the TWT interval of step 2115, the device performs at least one of an aggressive adjustment of the TWT interval (after the first cooldown timer has expired) or a conservative adjustment of the TWT interval (after the second cooldown timer has expired) (step 2150).

In order to perform the aggressive adjustment of the TWT interval at step 2150, the device determines a number of consecutive TWT SPs within the window of previous TWT SPs for which the traffic statistic falls below a first threshold. Then, based on the number of consecutive TWT SPs exceeding a second threshold, the device adjusts the TWT interval upward by a first amount that increases based on a number of consecutive times that the number of consecutive TWT SPs has exceeded the second threshold. Here, in the event that there are different sets of consecutive SPs for which the traffic statistic falls below the first threshold, then "the number of consecutive TWT SPs for which the traffic statistic falls below the first threshold" refers to the largest number of consecutive TWT SPs for which the traffic statistic falls below the first threshold.

In order to perform the conservative adjustment of the TWT interval at step 2150, the device determines an average of the traffic statistic over all TWT SPs in the window of previous TWT SPs. Based on the average exceeding a third threshold, the device adjusts the TWT interval downward by a predetermined second amount. The device may also determine a total number of TWT SPs within the window for which the traffic statistic falls below the first threshold. Then, based on the average falling below the third threshold and the total number exceeding a fourth threshold, the device adjusts the TWT interval upward by a third amount that is based on the total number.

After the device has performed the aggressive or conservative adjustment of the TWT interval, the device may adaptively modify one or more of the thresholds based on parameters related to the traffic statistic (step 2155).

Referring now to FIG. 21C, in order to identify the state of the device in step 2110 using the application identifier, the device determines, based on the application identifier, whether the application generates WI-FI traffic (step 2160). This may include, for example, querying a database that has information associated with the application identifier that indicates whether the application generates WI-FI traffic.

Next, the device may identify the state of the electronic device as idle based on a determination that the application does not generate WI-FI traffic (step 2165). For example, this may occur when information in the database associated with the application identifier indicates that the application does not generate WI-FI traffic. Otherwise, the device may identify the state as active.

Then, in order to perform the adjustment of the TWT interval of step 2115, the device adjusts the TWT interval upwards by a predetermined amount after each TWT service period (SP) during with the state is identified as idle (step 2170).

The above flowcharts illustrate example methods that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device comprising:
   a transceiver configured to receive WI-FI traffic for an application in a target wake time (TWT) operation; and
   a processor operably coupled to the transceiver and configured to:
      identify whether a state of the electronic device is idle or active based on at least one of a traffic statistic related to the WI-FI traffic or an application identifier of the application; and
      adjust a TWT interval of the TWT operation based on the state,
   wherein the processor is configured to:
      determine, after identification that the state is idle, that the state has changed to active based on a most recent traffic statistic that is observed in a most recent window of previous TWT service periods (SPs) being larger than previous traffic statistics observed in previous windows, or based on the most recent traffic statistic exceeding a threshold; or
      determine, after identification that the state is idle, that the state has changed to active upon determination, based on the application identifier, that the application does generate WI-FI traffic.

2. The electronic device of claim 1, wherein the processor is further configured to:
   observe the WI-FI traffic over a window of previous TWT service periods (SPs);
   obtain the traffic statistic for each TWT SP in the window based on the observed WI-FI traffic; and
   identify, based on the traffic statistic satisfying a predetermined condition, that the state of the electronic device is idle.

3. The electronic device of claim 2, wherein the processor is further configured to:
   perform, based on the state of the electronic device being idle, at least one of an aggressive adjustment of the TWT interval or a conservative adjustment of the TWT interval,
   wherein, to perform the aggressive adjustment of the TWT interval, the processor is further configured to:
      determine a number of consecutive TWT SPs within the window for which the traffic statistic falls below a first threshold; and
      based on the number of consecutive TWT SPs exceeding a second threshold, adjust the TWT interval upward by a first amount that increases based on a number of consecutive times that the number of consecutive TWT SPs has exceeded the second threshold, and
   wherein, to perform the conservative adjustment of the TWT interval, the processor is further configured to:
      determine an average of the traffic statistic over all TWT SPs in the window;
      based on the average exceeding a third threshold, adjust the TWT interval downward by a predetermined second amount;
      determine a total number of TWT SPs within the window for which the traffic statistic falls below the first threshold; and
      based on the average falling below the third threshold and the total number exceeding a fourth threshold, adjust the TWT interval upward by a third amount that is based on the total number.

4. The electronic device of claim 3, wherein the processor is further configured to:
   initiate a first cooldown timer and a second cooldown timer;
   decrement the first and second cooldown timers after each TWT SP;

perform the aggressive adjustment of the TWT interval after the first cooldown timer expires; and perform the conservative adjustment of the TWT interval after the second cooldown timer expires.

5. The electronic device of claim 3, wherein the processor is further configured to:

adaptively modify one or more of the thresholds based on parameters related to the traffic statistic.

6. The electronic device of claim 1, wherein the processor is further configured to:

determine, based on the application identifier, whether the application generates WI-FI traffic;

identify the state of the electronic device as idle based on a determination that the application does not generate WI-FI traffic; and after each TWT service period (SP) during with the state is identified as idle, adjust the TWT interval upwards by a predetermined amount.

7. A method for adjusting target wake time (TWT) parameters, comprising:

receiving, by an electronic device, WI-FI traffic for an application in a TWT operation;

identifying whether a state of the electronic device is idle or active based on at least one of a traffic statistic related to the WI-FI traffic or an application identifier of the application;

adjusting a TWT interval of the TWT operation based on the state; and determining, after identification that the state is idle, that the state has changed to active based on a most recent traffic statistic that is observed in a most recent window of previous TWT service periods (SPs) being larger than previous traffic statistics observed in previous windows, or based on the most recent traffic statistic exceeding a threshold; or determining, after identification that the state is idle, that the state has changed to active upon determination, based on the application identifier, that the application does generate WI-FI traffic.

8. The method of claim 7, further comprising:

observing the WI-FI traffic over a window of previous TWT service periods (SPs);

obtaining the traffic statistic for each TWT SP in the window based on the observed WI-FI traffic; and identifying, based on the traffic statistic satisfying a predetermined condition, that the state of the electronic device is idle.

9. The method of claim 8, further comprising:

performing, based on the state of the electronic device being idle, at least one of an aggressive adjustment of the TWT interval or a conservative adjustment of the TWT interval, wherein performing the aggressive adjustment of the TWT interval comprises:

determining a number of consecutive TWT SPs within the window for which the traffic statistic falls below a first threshold; and based on the number of consecutive TWT SPs exceeding a second threshold, adjusting the TWT interval upward by a first amount that increases based on a number of consecutive times that the number of consecutive TWT SPs has exceeded the second threshold, and wherein performing the conservative adjustment of the TWT interval comprises:

determining an average of the traffic statistic over all TWT SPs in the window;

based on the average exceeding a third threshold, adjusting the TWT interval downward by a predetermined second amount;

determining a total number of TWT SPs within the window for which the traffic statistic falls below the first threshold; and based on the average falling below the third threshold and the total number exceeding a fourth threshold, adjusting the TWT interval upward by a third amount that is based on the total number.

10. The method of claim 9, further comprising:

initiating a first cooldown timer and a second cooldown timer;

decrementing the first and second cooldown timers after each TWT SP;

performing the aggressive adjustment of the TWT interval after the first cooldown timer expires; and performing the conservative adjustment of the TWT interval after the second cooldown timer expires.

11. The method of claim 9, further comprising:

adaptively modifying one or more of the thresholds based on parameters related to the traffic statistic.

12. The method of claim 7, further comprising:

determining, based on the application identifier, whether the application generates WI-FI traffic;

identifying the state of the electronic device as idle based on a determination that the application does not generate WI-FI traffic; and after each TWT service period (SP) during with the state is identified as idle, adjusting the TWT interval upwards by a predetermined amount.

13. A non-transitory computer-readable medium configured to store instructions that, when executed by a processor, cause an electronic device to:

receive WI-FI traffic for an application in a target wake time (TWT) operation;

identify whether a state of the electronic device is idle or active based on at least one of a traffic statistic related to the WI-FI traffic or an application identifier of the application; and adjust a TWT interval of the TWT operation based on the state, wherein the instructions, when executed by the processor, further cause the electronic device to:

determine, after identification that the state is idle, that the state has changed to active based on a most recent traffic statistic that is observed in a most recent window of previous TWT service periods (SPs) being larger than previous traffic statistics observed in previous windows, or based on the most recent traffic statistic exceeding a threshold; or determine, after identification that the state is idle, that the state has changed to active upon determination, based on the application identifier, that the application does generate WI-FI traffic.

14. The non-transitory computer-readable medium of claim 13, wherein the instructions, when executed by the processor, further cause the electronic device to:

observe the WI-FI traffic over a window of previous TWT service periods (SPs);

obtain the traffic statistic for each TWT SP in the window based on the observed WI-FI traffic; and identify, based on the traffic statistic satisfying a predetermined condition, that the state of the electronic device is idle.

15. The non-transitory computer-readable medium of claim 14, wherein the instructions, when executed by the processor, further cause the electronic device to:

perform, based on the state of the electronic device being idle, at least one of an aggressive adjustment of the TWT interval or a conservative adjustment of the TWT interval, wherein, to cause the electronic device to perform the aggressive adjustment of the TWT interval, the instructions further cause the electronic device to:

determine a number of consecutive TWT SPs within the window for which the traffic statistic falls below a first threshold; and based on the number of consecutive TWT SPs exceeding a second threshold, adjust the TWT interval upward by a first amount that increases based on a number of consecutive times that the number of consecutive TWT SPs has exceeded the second threshold, and wherein, to cause the electronic device to perform the conservative adjustment of the TWT interval, the instructions further cause the electronic device to:

determine an average of the traffic statistic over all TWT SPs in the window;

based on the average exceeding a third threshold, adjust the TWT interval downward by a predetermined second amount;

determine a total number of TWT SPs within the window for which the traffic statistic falls below the first threshold; and based on the average falling below the third threshold and the total number exceeding a fourth threshold, adjust the TWT interval upward by a third amount that is based on the total number.

16. The non-transitory computer-readable medium of claim 15, wherein the instructions, when executed by the processor, further cause the electronic device to:

initiate a first cooldown timer and a second cooldown timer;

decrement the first and second cooldown timers after each TWT SP;

perform the aggressive adjustment of the TWT interval after the first cooldown timer expires; and perform the conservative adjustment of the TWT interval after the second cooldown timer expires.

17. The non-transitory computer-readable medium of claim 13, wherein the instructions, when executed by the processor, further cause the electronic device to:

determine, based on the application identifier, whether the application generates WI-FI traffic;

identify the state of the electronic device as idle based on a determination that the application does not generate WI-FI traffic; and after each TWT service period (SP) during with the state is identified as idle, adjust the TWT interval upwards by a predetermined amount.

18. The non-transitory computer-readable medium of claim 13, wherein the instructions, when executed by the processor, further cause the electronic device to adaptively modify one or more of the thresholds based on parameters related to the traffic statistic.

* * * * *